(12) United States Patent
Tanaka

(10) Patent No.: US 11,121,634 B2
(45) Date of Patent: Sep. 14, 2021

(54) BIDIRECTIONAL DC-TO-DC CONVERTER WITH INRUSH CURRENT SUPPRESSION

(71) Applicant: SHARP KABUSHIKI KAISHA, Sakai (JP)

(72) Inventor: Hiroki Tanaka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 72 days.

(21) Appl. No.: 16/700,650

(22) Filed: Dec. 2, 2019

(65) Prior Publication Data

US 2020/0186046 A1 Jun. 11, 2020

Related U.S. Application Data

(60) Provisional application No. 62/776,886, filed on Dec. 7, 2018.

(51) Int. Cl.
| | | |
|---|---|---|
| *H02M 3/335* | (2006.01) | |
| *H02M 1/08* | (2006.01) | |
| *H02M 1/32* | (2007.01) | |
| *H02M 1/36* | (2007.01) | |

(52) U.S. Cl.
CPC ......... *H02M 3/33584* (2013.01); *H02M 1/08* (2013.01); *H02M 1/32* (2013.01); *H02M 1/36* (2013.01); *H02M 3/3353* (2013.01)

(58) Field of Classification Search
CPC ........... H02M 3/33584; H02M 3/3376; H02M 3/3353; H02M 1/32; H02M 1/08; H02M 1/36; H02M 2001/0038
See application file for complete search history.

(56) References Cited

U.S. PATENT DOCUMENTS

| | | | | |
|---|---|---|---|---|
| 2015/0365005 A1* | 12/2015 | Panov | ............... | H02M 3/33584 307/24 |
| 2019/0052181 A1* | 2/2019 | Murthy-Bellur | ............... | H02M 3/33584 |

FOREIGN PATENT DOCUMENTS

| | | | | | |
|---|---|---|---|---|---|
| CN | 107317473 A | * | 11/2017 | | |
| CN | 108377094 A | * | 8/2018 | | |
| JP | 2014-087134 A | | 5/2014 | | |
| JP | 2014087134 A | * | 5/2014 | | |
| WO | WO-2014097844 A1 | * | 6/2014 | ........ | H02M 3/33584 |

* cited by examiner

*Primary Examiner* — Kyle J Moody
*Assistant Examiner* — Jye-June Lee
(74) *Attorney, Agent, or Firm* — ScienBiziP, P.C.

(57) ABSTRACT

A first full-bridge circuit, a transformer, a first reactor, a second full-bridge circuit, a second reactor, a capacitor, and a control unit are included. When activated, the control unit switches one or more of a combination of a first switching leg and a second switching leg and a combination of a third switching leg and a fourth switching leg with a certain second phase difference and drives first, third, fifth, and seventh switching devices or second, fourth, sixth, and eighth switching devices with a first duty ratio, which is lower than a duty ratio during normal operation.

20 Claims, 17 Drawing Sheets

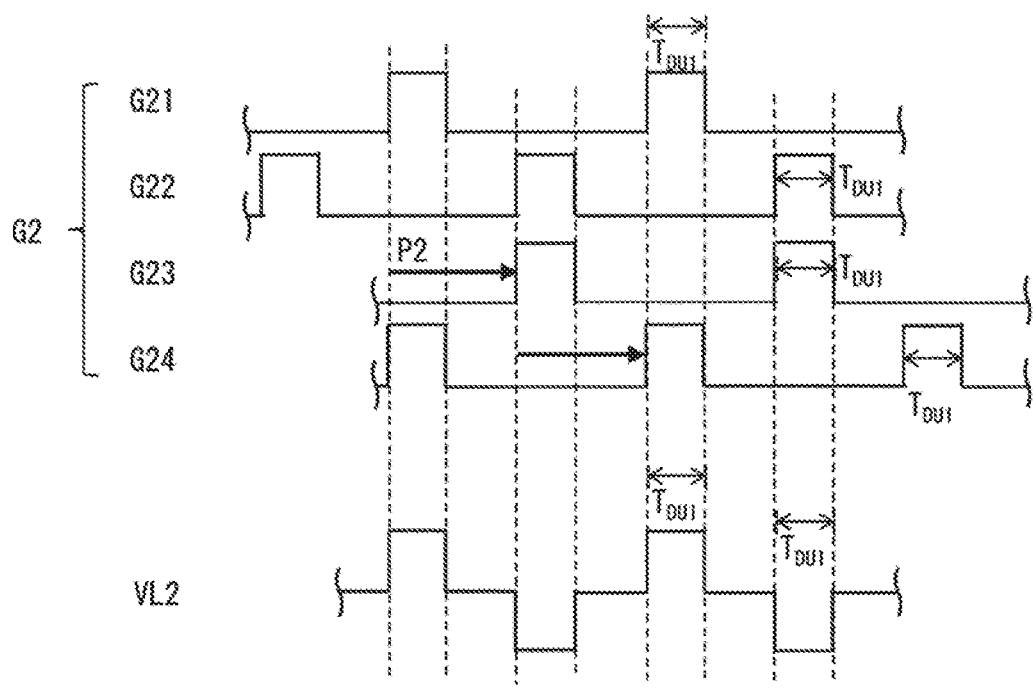

Related Art

BIDIRECTIONAL DC-TO-DC CONVERTER WITH INRUSH CURRENT SUPPRESSION

TECHNICAL FIELD

The present invention relates to a DC-to-DC converter, and more specifically to an insulating bidirectional DC-to-DC converter used in storage battery systems, electric automobile charging/discharging systems that employ an electric automobile, and the like.

BACKGROUND ART

During these years, charging/discharging systems that employ a storage battery mounted on a solar power generation system, a stationary storage system, or an electric automobile are attracting attention. For these systems, a method in which the storage battery is connected to a direct current bus through an insulating DC-to-DC converter for coordinated operation is being examined. Because a high-capacity capacitor might be connected to the direct current bus, a large current might flow at a time of activation or stopping of the insulating DC-to-DC converter. PTL 1, for example, discloses a DC-to-DC converter that suppresses inrush current at a time of activation. Because a feedback period needs to be provided, however, control of power transmission is complex. In addition, as a power transmission period becomes longer, a risk of unnecessary power transmission undesirably increases.

CITATION LIST

Patent Literature

[PTL 1] Japanese Unexamined Patent Application Publication No. 2014-087134 (Published on May 12, 2014)

SUMMARY OF INVENTION

Technical Problem

The above-described example of the related art, however, poses the following problem.

FIGS. 19A and 19B are diagram illustrating the problem of a conventional DC-to-DC converter. In the DC-to-DC converter employing a DAB (dual active bridge) method illustrated in FIGS. 19A and 19B, power transmission is controlled on the basis of a phase difference between a signal for driving a primary full-bridge circuit and a signal for driving a secondary full-bridge circuit. If there is a voltage difference between a voltage source connected to a primary side and a voltage source connected to a secondary side, however, inrush current undesirably flows at a time of activation in order to charge high-capacity capacitors provided inside the converter and at an input/output unit of the converter through body diodes for switching devices included in the full-bridge circuit on the primary or secondary side, whichever has a lower voltage, or freewheeling diodes connected in parallel with the switching devices. (For example, FIG. 19A illustrates current paths in a period T1 illustrated in FIG. 19B.) As a result of the flowing of inrush current, therefore, the devices might be damaged. Large inrush current undesirably flows especially when a load is connected to only one of input/output terminals, because the voltage difference becomes large.

An object of an aspect of the present invention is to solve the above problem and provide means for suppressing inrush current at a time of activation even when there is a difference between input voltage and output voltage in a DC-to-DC converter in which high-capacity capacitors are connected.

Solution to Problem (1) In order to solve the problem, a DC-to-DC converter according to an aspect of the present invention includes a first switching leg, which is a first switching device and a second switching device connected to each other, a second switching leg, which is a third switching device and a fourth switching device connected to each other, a first full-bridge circuit in which the first switching leg and the second switching leg are connected in parallel with each other and that converts direct current voltage from a first input/output terminal into alternating current voltage, a transformer, a first reactor, one of whose ends is connected to a node between the first switching device and the second switching device and another of whose ends is connected to an end of a primary winding of the transformer, a third switching leg, which is a fifth switching device and a sixth switching device connected to each other, a fourth switching leg, which is a seventh switching device and an eighth switching device connected to each other, a second full-bridge circuit in which the third switching leg and the fourth switching leg are connected in parallel with each other and that converts direct current voltage from a second input/output terminal into alternating current voltage, a second reactor, one of whose ends is connected to a node between the fifth switching device and the sixth switching device and another of whose ends is connected to a secondary winding of the transformer, a capacitor connected in parallel with each of the switching devices, and a control unit that controls transmission power by generating signals for driving the switching devices and adjusting a first phase difference between switching of the first full-bridge circuit and switching of the second full-bridge circuit. The control unit, when activated, switches at least either a combination of the first switching leg and the second switching leg or a combination of the third switching leg and the fourth switching leg with a certain second phase difference and drives the first, third, fifth, and seventh switching devices or the second, fourth, sixth, and eighth switching devices with a first duty ratio, which is lower than a duty ratio during normal operation.

(2) In addition, in a DC-to-DC converter according to a certain aspect of the present invention, in addition to the configuration according to (1), the control unit, when activated, may switch the first switching leg and the second switching leg with the certain second phase difference.

(3) In addition, in a DC-to-DC converter according to a certain aspect of the present invention, in addition to the configuration according to (1), the control unit, when activated, may switch the third switching leg and the fourth switching leg with the certain second phase difference.

(4) In addition, in a DC-to-DC converter according to a certain aspect of the present invention, in addition to the configuration according to (1), the control unit, when activated, may switch the combination of the first switching leg and the second switching leg and the combination of the third switching leg and the fourth switching leg with the certain second phase difference.

(5) In addition, in a DC-to-DC converter according to a certain aspect of the present invention, in addition to the configuration according to any of (1) to (4), the control unit may drive the second, fourth, sixth, and eighth switching devices using complementary signals of the signals for driving the first, third, fifth, and seventh switching devices or drive the first, third, fifth, and seventh switching devices using complementary signals of the signals for driving the second, fourth, sixth, and eighth switching devices.

(6) In addition, in a DC-to-DC converter according to a certain aspect of the present invention, in addition to the configuration according to any of (1) to (5), the control unit may perform a first step, in which duty ratios of the driving signals for the first, third, fifth, and seventh switching devices and/or duty ratios of the driving signals for the second, fourth, sixth, and eighth switching devices are increased to the first duty ratio, and a second step, in which a second phase difference between switching of the first switching leg and switching of the second switching leg and a second phase difference between switching of the third switching leg and switching of the fourth switching leg are changed to 180°.

(7) In addition, in a DC-to-DC converter according to a certain aspect of the present invention, in addition to the configuration according to any of (1) to (6), in the second step, a first phase difference between the switching of the first full-bridge circuit and the switching of the second full-bridge circuit may be set such that input current becomes equal to or smaller than a certain value.

(8) In addition, in a DC-to-DC converter according to a certain aspect of the present invention, in addition to the configuration according to any of (1) to (7), the control unit may drive the first, second, third, fourth, fifth, sixth, seventh, and eighth switching devices using signals having the first duty ratio.

(9) In addition, in a DC-to-DC converter according to a certain aspect of the present invention, in addition to the configuration according to any of (1) to (8), the driving signals for the second and fourth switching devices may have same duty ratios as the driving signals for the first and third switching devices, respectively, but out of phase with each other by 180° and/or the driving signals for the sixth and eighth switching devices may have same duty ratios as the driving signals for the fifth and seventh switching devices, respectively, but out of phase with each other by 180°.

(10) In addition, in a DC-to-DC converter according to a certain aspect of the present invention, in addition to the configuration according to any of (1) to (7), the certain second phase difference may be equal to or smaller than (180°−(first duty ratio×360°)). The control unit may perform a first step, in which duty ratios of the driving signals for the first, third, fifth, and seventh switching devices and/or duty ratios of the driving signals for the second, fourth, sixth, and eighth switching devices are increased to the first duty ratio, and a second step, in which a second phase difference between switching of the first switching leg and switching of the second switching leg and a second phase difference between switching of the third switching leg and switching of the fourth switching leg are changed to 180°.

(11) In addition, in a DC-to-DC converter according to a certain aspect of the present invention, in addition to the configuration according to (10), in the second step, a first phase difference between the switching of the first full-bridge circuit and the switching of the second full-bridge circuit may be set such that input current becomes equal to or smaller than a certain value.

(12) In addition, in a DC-to-DC converter according to a certain aspect of the present invention, in addition to the configuration according to any of (1) to (11), the certain second phase difference may be 0°.

(13) In addition, in a DC-to-DC converter according to a certain aspect of the present invention, in addition to the configuration according to any of (1) to (12), the control unit may perform a third step, in which output voltage is adjusted to a target voltage by controlling input current by changing the first phase difference between the switching of the first full-bridge circuit and the switching of the second full-bridge circuit.

(14) In addition, in a DC-to-DC converter according to a certain aspect of the present invention, in addition to the configuration according to (13), the control unit may include means for determining whether the output voltage has reached the target voltage in the third step within a certain period of time and means for increasing the first duty ratio if the output voltage has not reached the target voltage.

(15) In addition, in a DC-to-DC converter according to a certain aspect of the present invention, in addition to the configuration according to (14), the control unit may perform a fourth step, in which the duty ratios of the driving signals for the first, third, fifth, and seventh switching devices are increased to a second duty ratio. In the fourth step, the control unit may adjust the output voltage to the target voltage by changing the first phase difference between the switching of the first full-bridge circuit and the switching of the second full-bridge circuit.

(16) In addition, in a DC-to-DC converter according to a certain aspect of the present invention, in addition to the configuration according to any of (1) to (15), at a time of stopping, the control unit may perform a first stopping step, in which duty ratios of the driving signals for the first, third, fifth, and seventh switching devices and/or duty ratios of the driving signals for the second, fourth, sixth, and eighth switching devices are decreased to a certain duty ratio, and a second stopping step, in which a second phase difference between switching of the first switching leg and switching of the second switching leg and a second phase difference between switching of the third switching leg and switching of the fourth switching leg are changed to 0°.

(17) In addition, a DC-to-DC converter according to a certain aspect of the present invention may further include, in addition to the configuration according to any of (1) to (16), a capacitor circuit, which is a first capacitor and a second capacitor connected in series with each other. The capacitor circuit may be connected in parallel with the first full-bridge circuit or the second full-bridge circuit.

A center tap may be provided for a primary winding or a secondary winding of the transformer. The center tap may be connected to the node between the first and second capacitors. A third reactor may be connected to an end of the primary or secondary winding, whichever the center tap is provided, to which the first or second reactor is not connected.

(18) In addition, in a DC-to-DC converter according to a certain aspect of the present invention, in addition to the configuration according to any of (1) to (17), a diode may be connected in parallel with each of the switching devices.

(19) In addition, in a DC-to-DC converter according to a certain aspect of the present invention, in addition to the configuration according to any of (1) to (18), at least either the first reactor or the second reactor may be achieved by leakage inductance of the transformer.

Advantageous Effects of Invention

According to an aspect of the present invention, means for suppressing inrush current at a time of activation even when there is a difference between input voltage and output voltage in a DC-to-DC converter in which high-capacity capacitors are connected can be provided.

BRIEF DESCRIPTION OF DRAWINGS

FIG. 14B is a diagram illustrating means for suppressing input current in the second step according to the second embodiment.

DESCRIPTION OF EMBODIMENTS

First Embodiment

A first embodiment of the present invention will be described in detail hereinafter with reference to the drawings.

Figure 1:
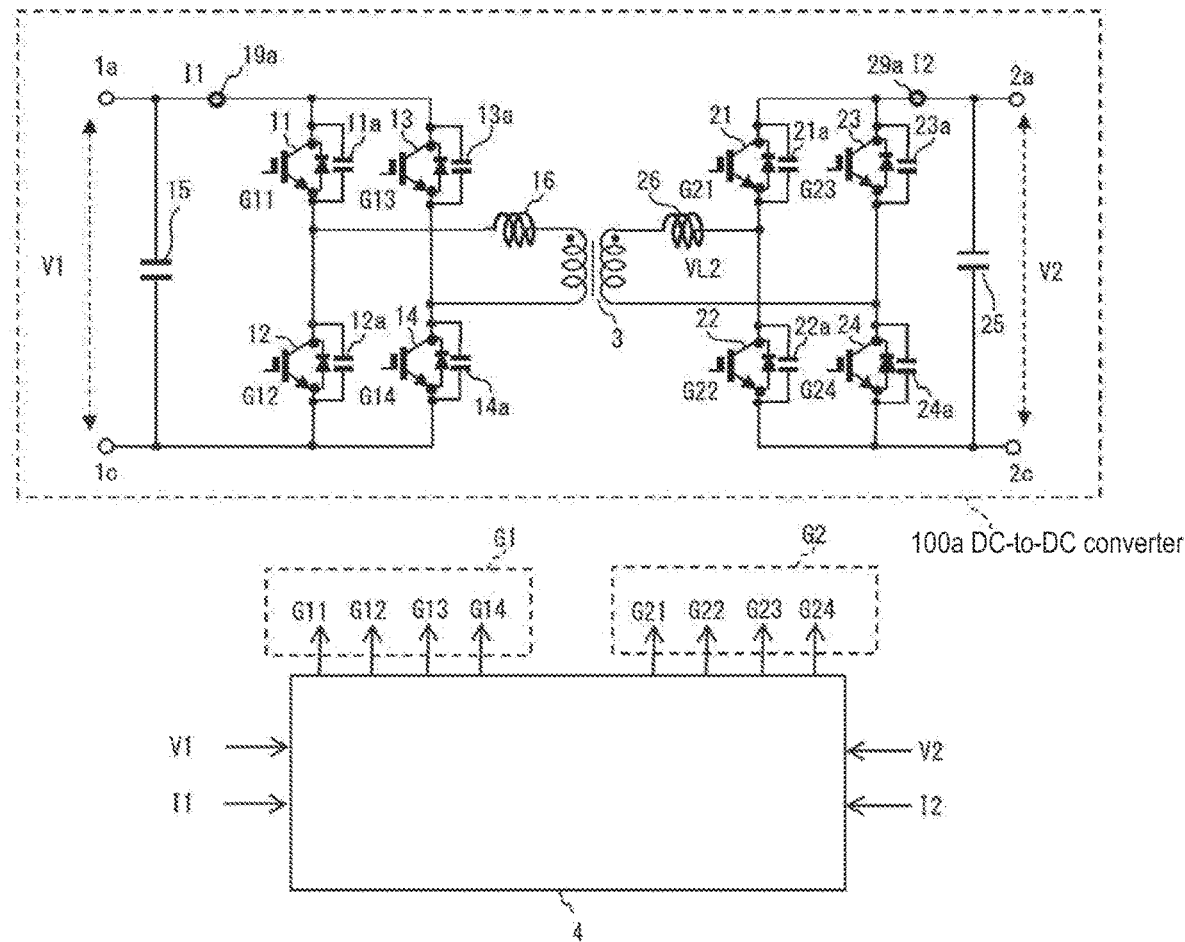
FIG. 1 is a diagram illustrating the configuration of a DC-to-DC converter according to a first embodiment of the present invention.

FIG. 1 is a diagram illustrating the configuration of a DC-to-DC converter $100a$ according to the first embodiment of the present invention. Here, the DC-to-DC converter $100a$ includes $1a$ and $1c$ as primary input/output terminals and $2a$ and $2c$ as secondary input/output terminals.

A capacitor 15 is connected between the input/output terminals $1a$ and $1c$. A capacitor 25 is connected between the input/output terminals $2a$ and $2c$.

A primary full-bridge circuit (first full-bridge circuit) is formed by four IGBTs (insulated-gate bipolar transistors) 11, 12, 13, and 14 on a primary side of a transformer 3. A secondary full-bridge circuit (second full-bridge circuit) is formed by four IGBTs 21, 22, 23, and 24 on a secondary side of the transformer 3. A capacitor is connected in parallel with each IGBT, and a diode is connected in antiparallel with each IGBT.

Although IGBTs are used as switching devices herein, transistors such as FETs (field-effect transistors) or HEMTs (high-electron-mobility transistors) may be used, instead.

In the primary full-bridge circuit, the IGBT 11 and the IGBT 12 are connected to each other to form a first switching leg and the IGBT 13 and the IGBT 14 are connected to each other to form a second switching leg.

Furthermore, in the second full-bridge circuit, the IGBT 21 and the IGBT 22 are connected to each other to form a third switching leg and the IGBT 23 and the IGBT 24 are connected to each other to form a fourth switching leg.

In addition, a reactor 16 (first reactor) is connected between a node between the IGBTs 11 and 12 and an end of a primary winding of the transformer 3, and a node between the IGBT 13 and the IGBT 14 and another end of the primary winding of the transformer 3 are connected to each other.

In addition, a reactor 26 (second reactor) is connected between a node between the IGBTs 21 and 22 and an end of a secondary winding of the transformer 3, and a node between the IGBT 23 and the IGBT 24 and another end of the secondary winding of the transformer 3 are connected to each other.

In addition, a control unit 4 that controls switching of each IGBT is provided.

Here, the control unit 4 includes voltage detection means and obtains information regarding a voltage V1 between the primary input/output terminals $1a$ and $1c$ and a voltage V2 between the secondary input/output terminals $2a$ and $2c$.

The control unit 4 also includes current detection means and obtains information regarding a current I1 in a primary wiring $19a$ and a current I2 in a secondary wiring $29a$.

A primary gate driving signal G1 and a secondary gate driving signal G2 are generated on the basis of these pieces of information and control is performed such that a certain power conversion is achieved.

Here, G11, G12, G13, and G14 are gate driving signals for the IGBT 11, the IGBT 12, the IGBT 13, and the IGBT 14, respectively, in the primary full-bridge circuit. G21, G22, G23, and G24 are gate driving signals for the IGBT 21, the IGBT 22, the IGBT 23, and the IGBT 24, respectively, in the secondary full-bridge circuit.

Figure 2:
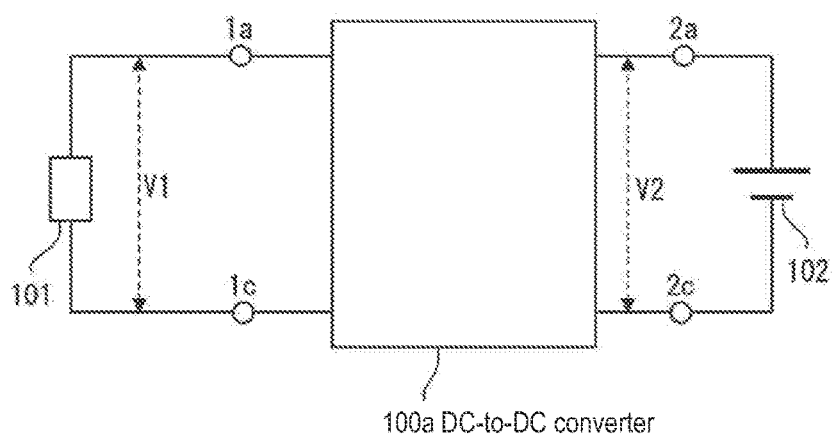
FIG. 2 is a configuration diagram illustrating the first embodiment.

The DC-to-DC converter 100a according to the first embodiment of the present invention can transmit power bidirectionally, but in the present embodiment, as illustrated in FIG. 2, a load 101 is connected between the primary input/output terminals 1a and 1c of the DC-to-DC converter 100a illustrated in FIG. 1 and a storage battery 102 is connected between the secondary input/output terminals 2a and 2c. Here, the storage battery 102 transmits power to the load 101. The DC-to-DC converter 100a might be referred to as a main circuit hereinafter.

Figure 3:
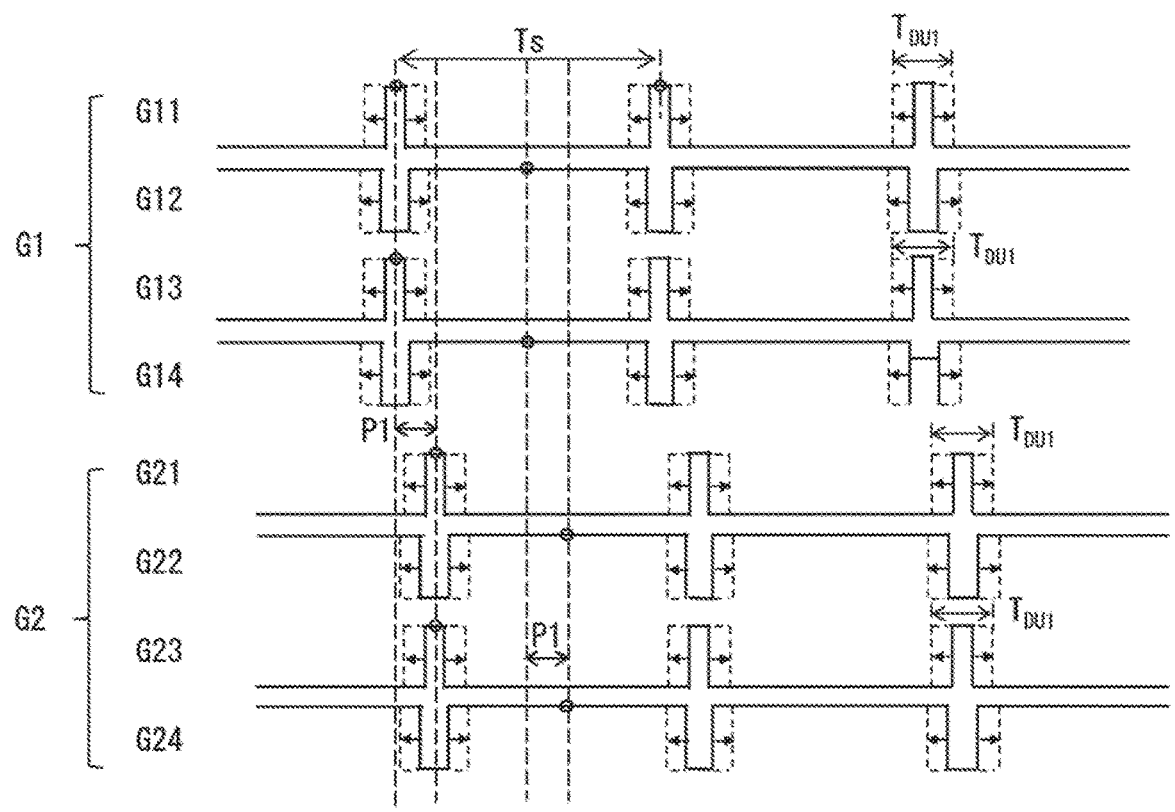
FIG. 3 is a diagram illustrating a first step according to the first embodiment.

In order to start power conversion, first, as illustrated in FIG. 3, the control unit 4 performs a first step, in which the gate driving signals for the IGBTs that form the primary full-bridge circuit and the secondary full-bridge circuit are fixed to a period Ts and duty ratios of the signals G11 and G13 for driving the upper IGBTs of the primary full-bridge circuit and the signals G21 and G23 for driving the upper IGBTs of the secondary full-bridge circuit are increased to a first duty radio DU1. A period corresponding to the first duty ratio DU1 is denoted by $T_{DU1}$. Here, the first duty ratio DU1 is 0.16.

Although the duty ratios of the signals for driving the upper IGBTs of each full-bridge circuit are increased to the first duty ratio DU1 in the present embodiment, the signals for driving the upper IGBTs and the signals for driving the lower IGBTs may be switched, instead. In addition, an appropriate dead band is provided for each switching leg so that a short circuit does not occur.

Figure 4A:
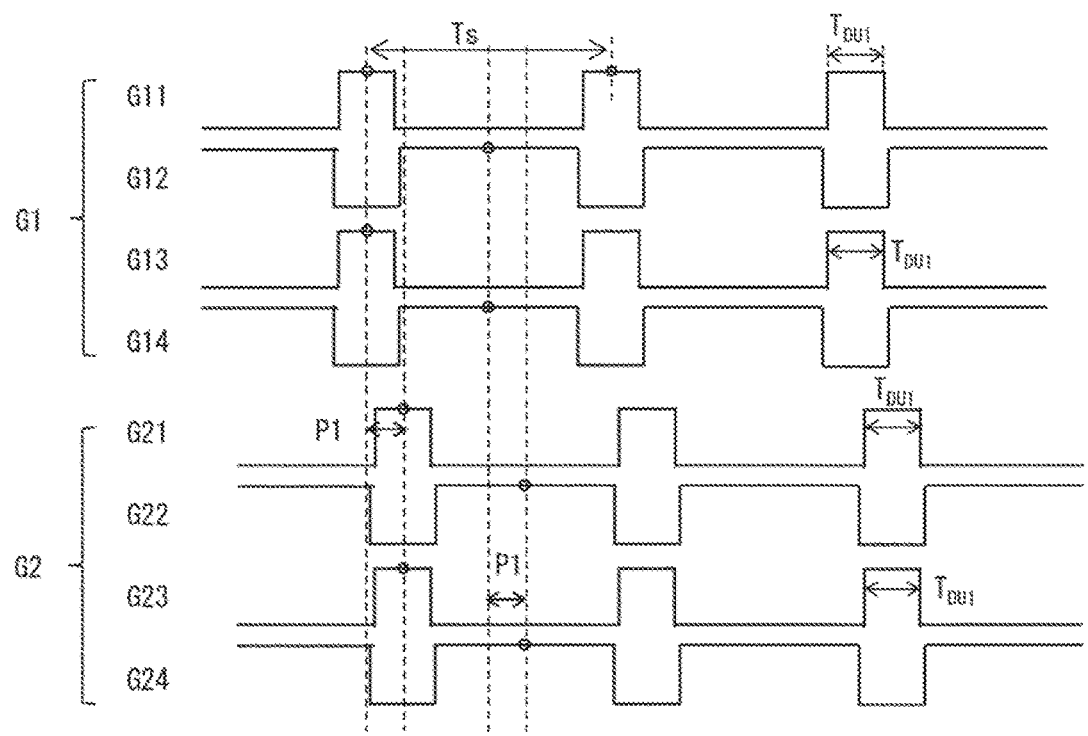
FIG. 4A is a diagram illustrating driving waveforms of switching devices at an end of the first step according to the first embodiment.

It is assumed that in the first step, the signals (G11 and G12) for driving the first switching leg included in the primary full-bridge circuit and the signals (G13 and G14) for driving the second switching leg are in phase with each other. It is also assumed that the signals (G21 and G22) for driving the third switching leg included in the secondary full-bridge circuit and the signals (G23 and G24) for driving the fourth switching leg are in phase with each other. FIG. 4A illustrates IGBT driving waveforms at an end of the first step.

Here, when activated, the control unit 4 sets a first phase difference P1 between driving signals G1 (G11 to G14) for the primary full-bridge circuit and driving signals G2 (G21 to G24) for the secondary full-bridge circuit to a fixed value so that phases of the signals G2 for driving the secondary full-bridge circuit delay. In addition, when activated, the control unit 4 drives the IGBTs 11, 13, 15, and 17 or the IGBTs 12, 14, 16, and 18 with the first duty ratio, which is lower than a duty ratio during normal operation.

Driving signals from a primary voltage source or a secondary voltage source, whichever has a lower potential, are caused to delay. Because the potential of the secondary voltage source is higher here, a fixed value is set so that the phases of the driving signals G2 delay. In doing so, input current can be suppressed in a second step.

A phase difference in the present embodiment between the driving signals G1 for the primary full-bridge circuit and the driving signals G2 for the secondary full-bridge circuit is defined as a first phase difference P1.

Since the first switching leg and the second switching leg are switched in-phase and the third switching leg and the fourth switching leg are switched in-phase in the first step, the duty ratios of the signals G11 and G13 for driving the upper IGBTs of the primary full-bridge circuit and the signals G21 and G23 for driving the upper IGBTs of the secondary full-bridge circuit can be increased to the first duty ratio DU1.

As described above, the DC-to-DC converter 100a according to the first embodiment of present invention is a DC-to-DC converter including a first switching leg, which is a first switching device IGBT 11 and a second switching device IGBT 12 connected to each other, a second switching leg, which is a third switching device IGBT 13 and a fourth switching device IGBT 14 connected to each other, a first full-bridge circuit in which the first switching leg and the second switching leg are connected in parallel with each other and that converts direct current voltage from a first input/output terminal 1a or 1c into alternating current voltage, a transformer 3, a first reactor 16, one of whose ends is connected to a node between the first switching device IGBT 11 and the second switching device IGBT 12 and another of whose ends is connected to an end of a primary winding of the transformer 3, a third switching leg, which is a fifth switching device IGBT 21 and a sixth switching device IGBT 22 connected to each other, a fourth switching leg, which is a seventh switching device IGBT 23 and an eighth switching device IGBT 24 connected to each other, a second full-bridge circuit in which the third switching leg and the fourth switching leg are connected in parallel with each other and that converts direct current voltage from a second input/output terminal 2a or 2c into alternating current voltage, a second reactor 26, one of whose ends is connected to a node between the fifth switching device IGBT 21 and the sixth switching device IGBT 22 and another of whose ends is connected to a secondary winding of the transformer 3, a capacitor 15 or 25 connected in parallel with each of the switching devices, and a control unit 4 that controls transmission power by generating signals for driving the switching devices and adjusting a first phase difference P1 between switching of the first full-bridge circuit and switching of the second full-bridge circuit. The control unit 4, when activated, switches at least either a combination of the first switching leg and the second switching leg or a combination of the third switching leg and the fourth switching leg with a certain second phase difference P2 and drives the first, third, fifth, and seventh switching devices IGBT 11, IGBT 13, IGBT 21, and IGBT 23 or the second, fourth, sixth, and eighth switching devices IGBT 12, IGBT 14, IGBT 22, and IGBT 24 with a first duty ratio DU1, which is lower than a duty ratio during normal operation.

"During normal operation" herein refers to a situation in which the normal operation of the DC-to-DC converter 100a except for the time of activation and a time of stopping, which will be described later, is being performed.

With this configuration, since on periods of the switching devices are limited at the time of activation by switching at least either a combination of the first switching leg and the second switching leg or a combination of the third switching leg and the fourth switching leg with the certain second phase difference P2 and driving the switching devices with the first duty ratio, which is lower than the duty ratio during the normal operation, inrush current can be prevented.

When power is transmitted from the first input/output terminal 1a or 1c to which a voltage source is connected to the second input/output terminal 2a or 2c to which a load is connected, for example, the output pulse width of the first full-bridge circuit can be reduced by driving the switching devices with the first duty ratio, which is lower than the duty ratio during the normal operation. Current flowing to the first reactor 16, therefore, can be limited. In addition, current flowing to capacitors and the load provided for the second full-bridge circuit and the second input/output terminals 2a and 2c can be limited through body diodes for the switching devices of the second full-bridge circuit and freewheeling diodes connected in parallel with the switching devices, and inrush current can be suppressed.

Phase differences between the driving signals for the switching leg circuits in each full-bridge circuit according to the present embodiment are defined as second phase differences P2.

In addition, in the DC-to-DC converter 100a according to the present embodiment, the control unit 4, when activated, may switch the first switching leg and the second switching leg with the certain second phase difference P2.

With this configuration, only the first full-bridge circuit can be appropriately switched with the certain second phase difference P2.

In addition, in the DC-to-DC converter 100a according to the present embodiment, the control unit 4, when activated, may switch the third switching leg and the fourth switching leg with the certain second phase difference P2.

With this configuration, only the second full-bridge circuit can be appropriately switched with the second phase difference P2.

In addition, in the DC-to-DC converter 100a according to the present embodiment, the control unit 4, when activated, may switch the first switching leg and the second switching leg and the third switching leg and the fourth switching leg with the certain second phase difference P2.

With this configuration, the first and second full-bridge circuits can be appropriately switched with the certain second phase difference P2.

In addition, in the DC-to-DC converter 100a according to the present embodiment, the control unit 4 may drive the second, fourth, sixth, and eighth switching devices IGBT 12, IGBT 14, IGBT 22, and IGBT 24 using complementary signals of the signals for driving the first, third, fifth, and seventh switching devices IGBT 11, IGBT 13, IGBT 21, and IGBT 23 or drives the first, third, fifth, and seventh switching devices IGBT 11, IGBT 13, IGBT 21, and IGBT 23 using complementary signals of the signals for driving the second, fourth, sixth, and eighth switching devices IGBT 12, IGBT 14, IGBT 22, and IGBT 24.

Figure 4B:
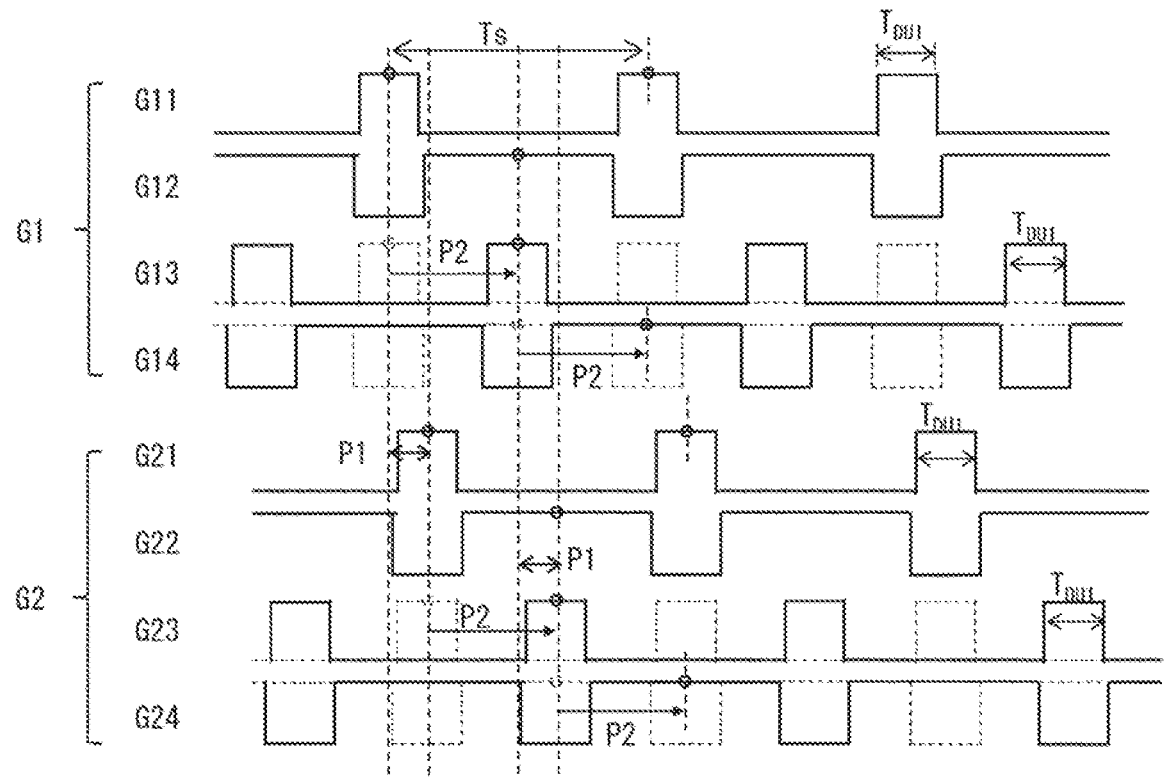
FIG. 4B is a diagram illustrating a second step according to the first embodiment.

Next, the second step illustrated in FIG. 4B is performed. In the second step, a second phase difference P2 between switching of the first switching leg and switching of the second switching leg and a second phase difference P2 between switching of the third switching leg and switching of the fourth switching leg are changed to 180° at a certain speed.

Figure 5A:
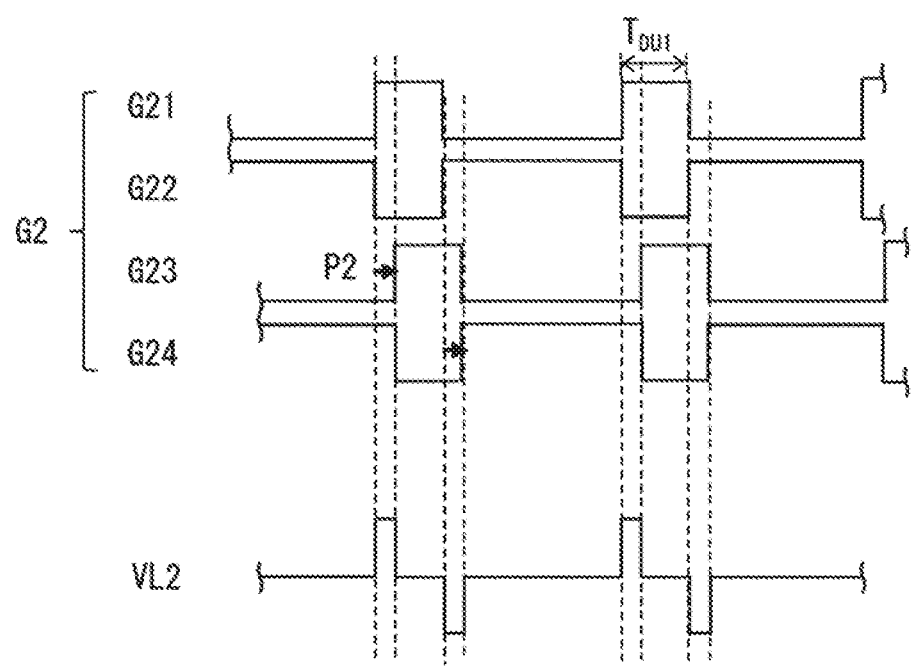
FIG. 5A is a diagram illustrating means for suppressing input current in the second step according to the first embodiment.
Figure 5B:
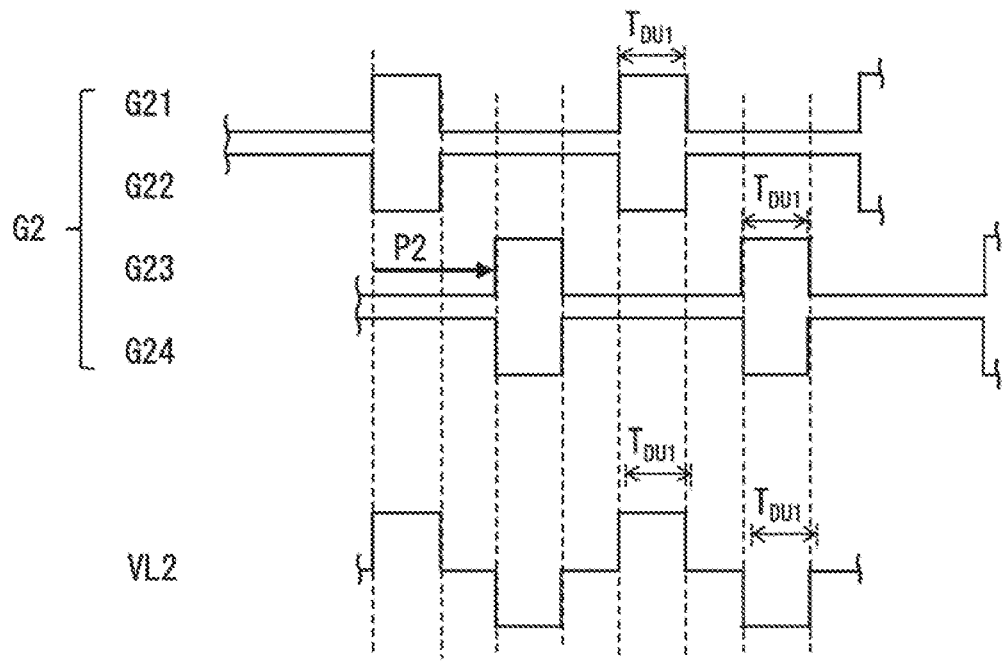
FIG. 5B is a diagram illustrating means for suppressing input current in the second step according to the first embodiment.

At this time, the pulse width of a voltage VL2 applied to the second reactor 26 on the secondary side connected to the voltage source (storage battery) can be gradually increased in accordance with the second phase difference P2. When the second phase difference P2 is small, for example, the pulse width of the voltage VL2 is small as illustrated in FIG. 5A. When the second phase difference P2 becomes 180°, however, the pulse width of the voltage VL2 is increased a width according to the first duty ratio DU1 as illustrated in FIG. 5B.

Since the pulse width of the voltage VL2 can be controlled by the second phase difference P2, inrush current in the second step can be suppressed by adjusting a speed at which the second phase difference P2 changes.

In addition, since the pulse width of the voltage VL2 is limited to the width according to the first duty ratio DU1 even after the second phase difference P2 becomes 180°, input current can be suppressed.

In addition, although, since the potential of the secondary voltage source is higher in the second step, too, the first phase difference P1 between the driving signals G1 (G11 to G14) for the primary full-bridge circuit and the driving signals G2 (G21 to G24) for the secondary full-bridge circuit is set to a fixed value so that the phases of the driving signals G2 delay, the first phase difference P1 may be dynamically changed, instead. Input current can be suppressed by setting a certain value such that the phases of the driving signals G2 delay.

In the DC-to-DC converter 100a according to the present embodiment, the control unit 4 performs a first step, in which duty ratios of the driving signals for the first, third, fifth, and seventh switching devices IGBT 11, IGBT 13, IGBT 21, and IGBT 23 and/or duty ratios of the driving signals for the second, fourth, sixth, and eighth switching devices IGBT 12, IGBT 14, IGBT 22, and IGBT 24 are increased to the first duty ratio, and a second step, in which a second phase difference P2 between switching of the first switching leg and switching of the second switching leg and a second phase difference P2 between switching of the third switching leg and switching of the fourth switching leg are changed to 180°.

Next, a third step, in which output voltage is adjusted to a target voltage by controlling input current by changing the first phase difference P1 between the switching of the first full-bridge circuit and the switching of the second full-bridge circuit, is performed.

Figure 6A:
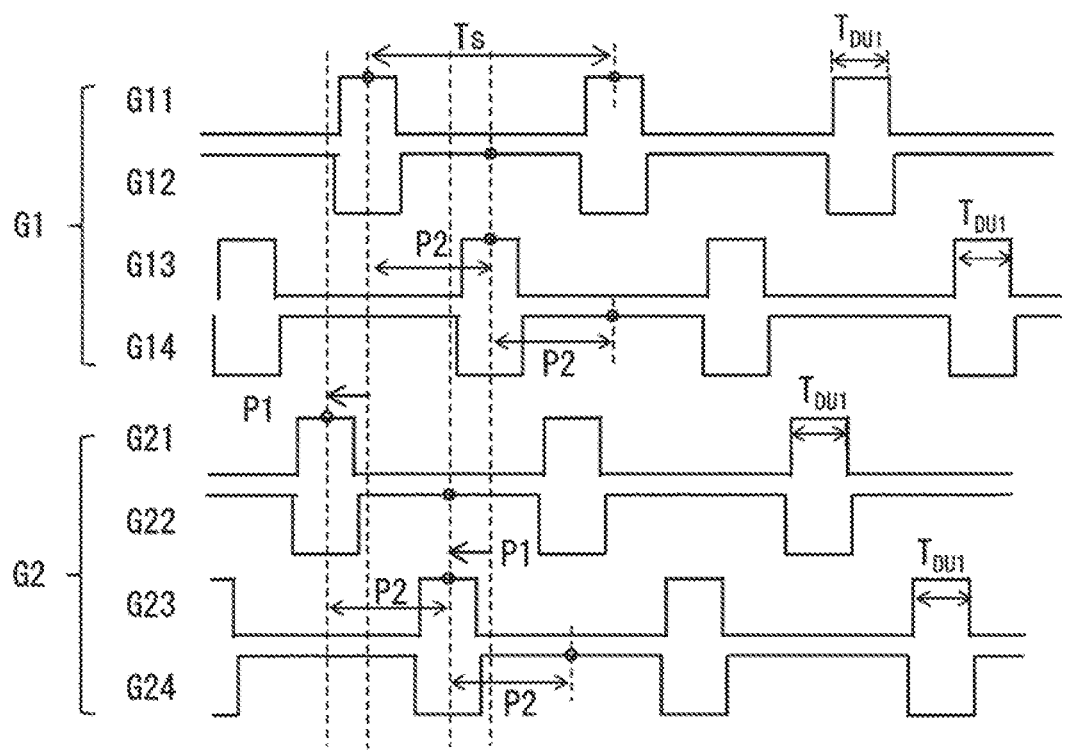
FIG. 6A is a diagram illustrating driving waveforms of the switching devices in a third step according to the first embodiment.
Figure 6B:
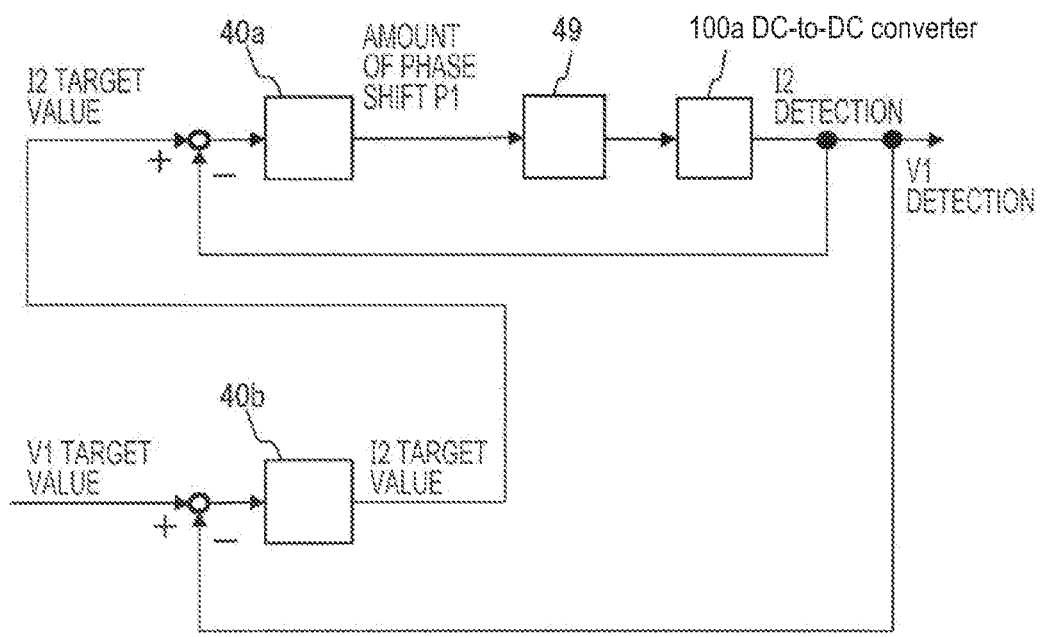
FIG. 6B is a diagram illustrating a control method in the third step according to the first embodiment.

Here, for example, a primary output voltage V1 is adjusted to a target value of the primary output voltage V1 using control blocks illustrated in FIG. 6B.

The control unit 4 detects the primary output voltage V1 and calculates a target value of the secondary input current I2 on the basis of an error from the target value of the primary output voltage V1 using a voltage controller 40b. The control unit 4 also detects the secondary input current I2 and determines the first phase difference P1 on the basis of an error from a target value of the secondary input current I2 using a current controller 40a. A signal generator 49 drives the IGBTs of the main circuit 100a by generating driving signals having the first phase difference P1 as illustrated in FIG. 6A.

The output voltage V1 can be controlled with the input current I2 using such control blocks, and inrush current can be suppressed.

Figure 7:
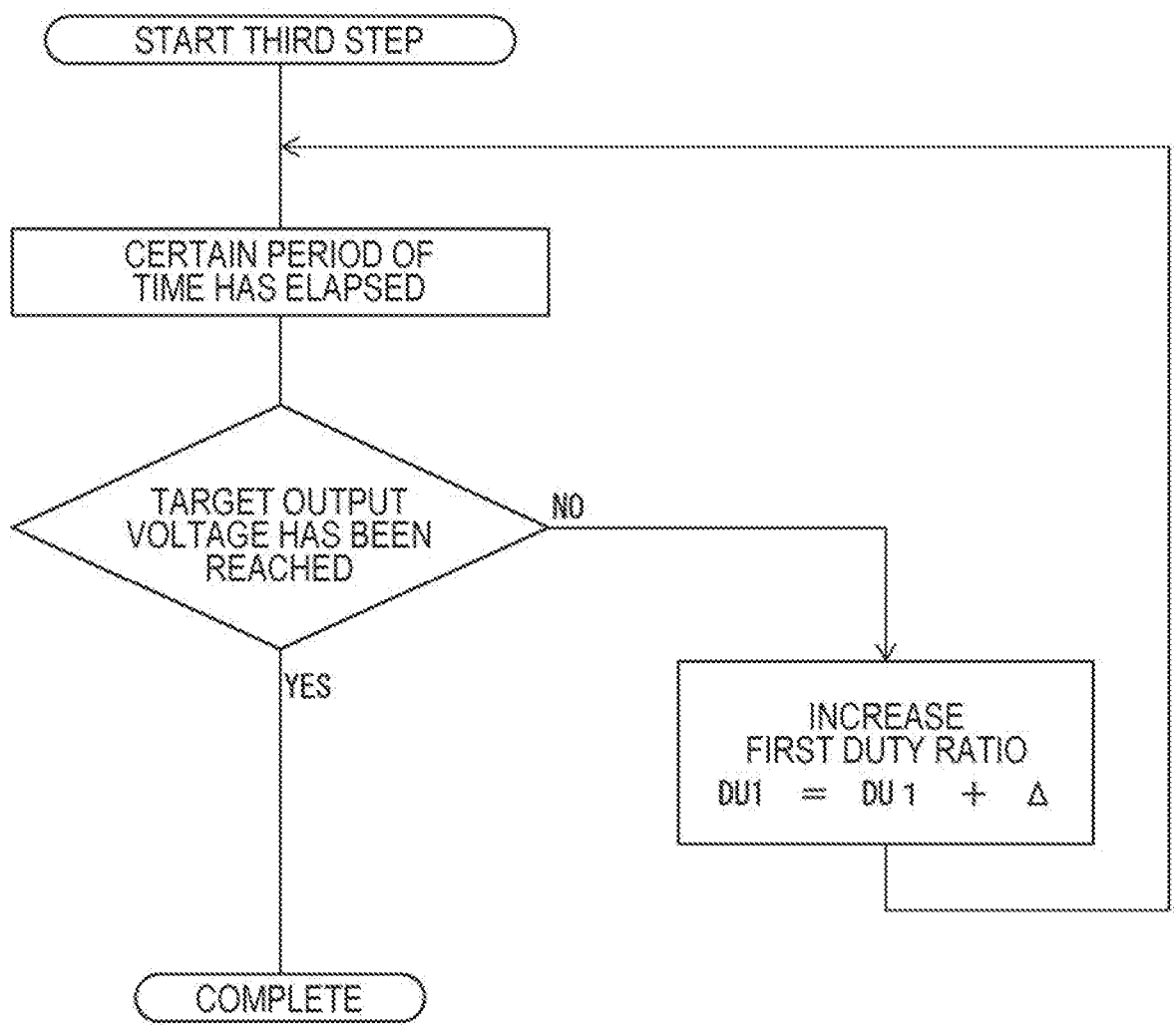
FIG. 7 is a diagram illustrating a control method in the third step according to the first embodiment.

Here, as illustrated in a flowchart of FIG. 7, the control unit 4 determines whether the primary output voltage V1 has reached a target voltage in the third step within a certain period of time. If not, the control unit 4 increases the first duty ratio DU1 of the gate driving signals by a certain value Δ.

The target voltage cannot be reached only through the driving based on the first duty ratio DU1 depending on the load. If it is determined that the target voltage has not been reached within the certain period of time, however, the output voltage can be made closer to the target voltage by increasing the first duty ratio DU1 by the certain value.

The output voltage can be gradually adjusted to the target voltage with the input current by changing the input current I2 such that the output voltage V1 becomes the target output voltage value. Inrush current can therefore be suppressed.

Figure 8A:
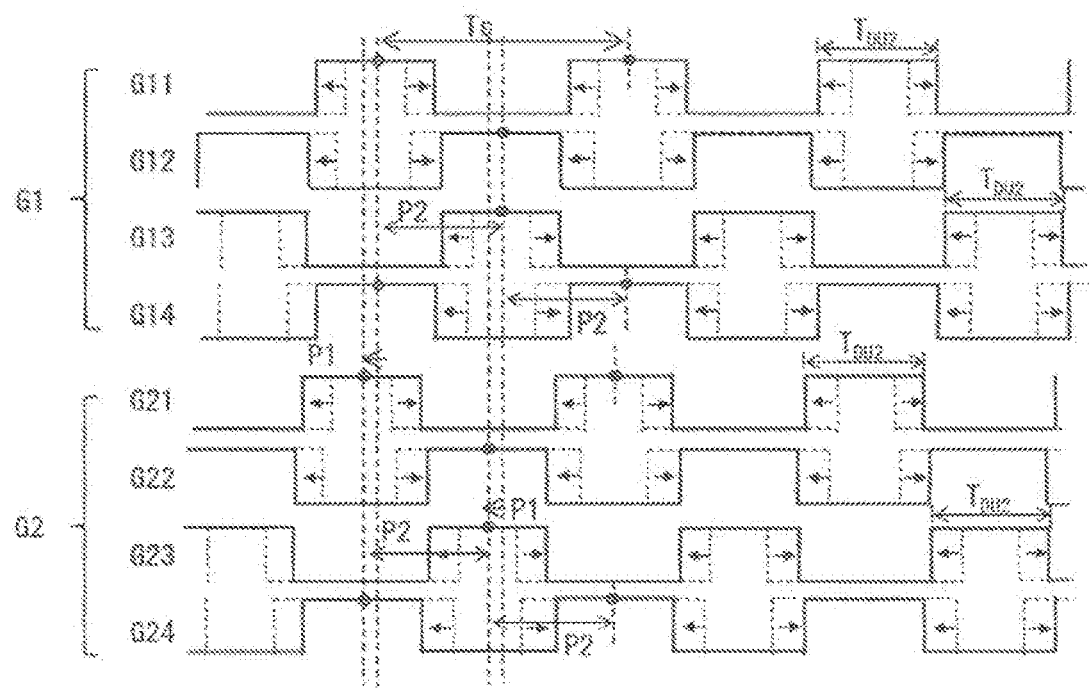
FIG. 8A is a diagram illustrating a fourth step according to the first embodiment.

Next, as illustrated in FIG. 8A, a fourth step, in which duty ratios of driving signals for first, third, fifth, and seventh switching devices are increased to a second duty ratio DU2, is performed. A period corresponding to the second duty ratio DU2 is denoted by $T_{DU2}$. Here, the second duty ratio DU2 is 0.45.

In addition, in the fourth step, the first phase difference P1 between the switching of the first full-bridge circuit and the switching of the second full-bridge circuit is changed such that the output voltage becomes the target voltage. For example, control is performed such that the primary output voltage V1 becomes a primary target output voltage using control blocks illustrated in FIG. 8B.

The control unit 4 detects the primary output voltage V1 and determines the first phase difference P1 on the basis of an error from the target value of the primary output voltage V1 using the voltage controller 40b. As illustrated in FIG. 8A, the signal generator 49 drives the IGBTs of the main circuit 100a by generating driving signals having the first phase difference P1.

Figure 8B:
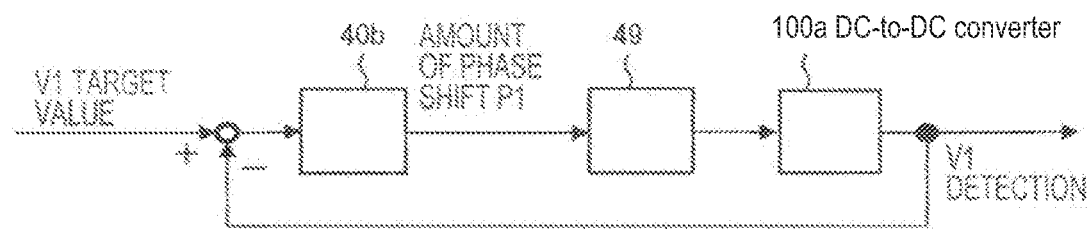
FIG. 8B is a diagram illustrating a control method in the fourth step according to the first embodiment.

Although the control blocks illustrated in FIG. 8B is used here, the control blocks illustrated in FIG. 6B may be used, instead.

Duty ratios of the driving signals are set to the certain duty ratio DU2 in the fourth step with phases of the switching legs of each full-bridge shifted from each other by 180°. As a result, outputting of the primary target output voltage is achieved, preparation for transmission of certain power ends, and activation is completed.

In power transmission during the normal operation, the first phase difference P1 is adjusted such that the output voltage remains at the target voltage even if the load changes. For example, the control blocks illustrated in FIG. 8B may be used. Since only the first phase difference P1 is changed, control performed is simplified.

After stopping, a first stopping step, in which the duty ratios of the driving signals for the first, third, fifth, and seventh switching devices are decreased to the first duty ratio, and a second stopping step, in which the second phase difference P2 between the switching of the first switching leg and the switching of the second switching leg and the second phase difference P2 between the switching of the third switching leg and the switching of the fourth switching leg are changed to 0°, are performed.

Figure 9A:
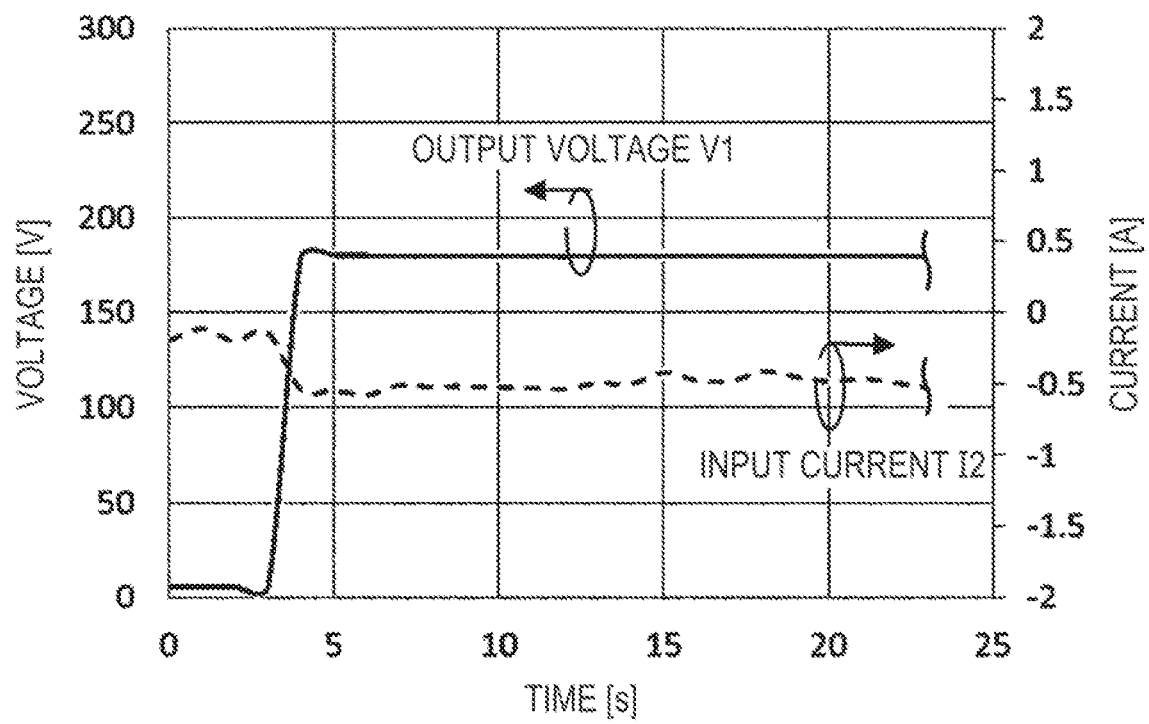
FIG. 9A is a diagram illustrating characteristics at a time of activation according to the first embodiment.

FIG. 9A illustrates the output voltage V1 and the input current I2 at a time of starting. Here, the secondary input voltage V2 was 180 V, the primary load 101 was 1 kΩ, and the primary target output voltage was 180 V. It can be seen that the input current I2 was smoothly activated.

Figure 9B:
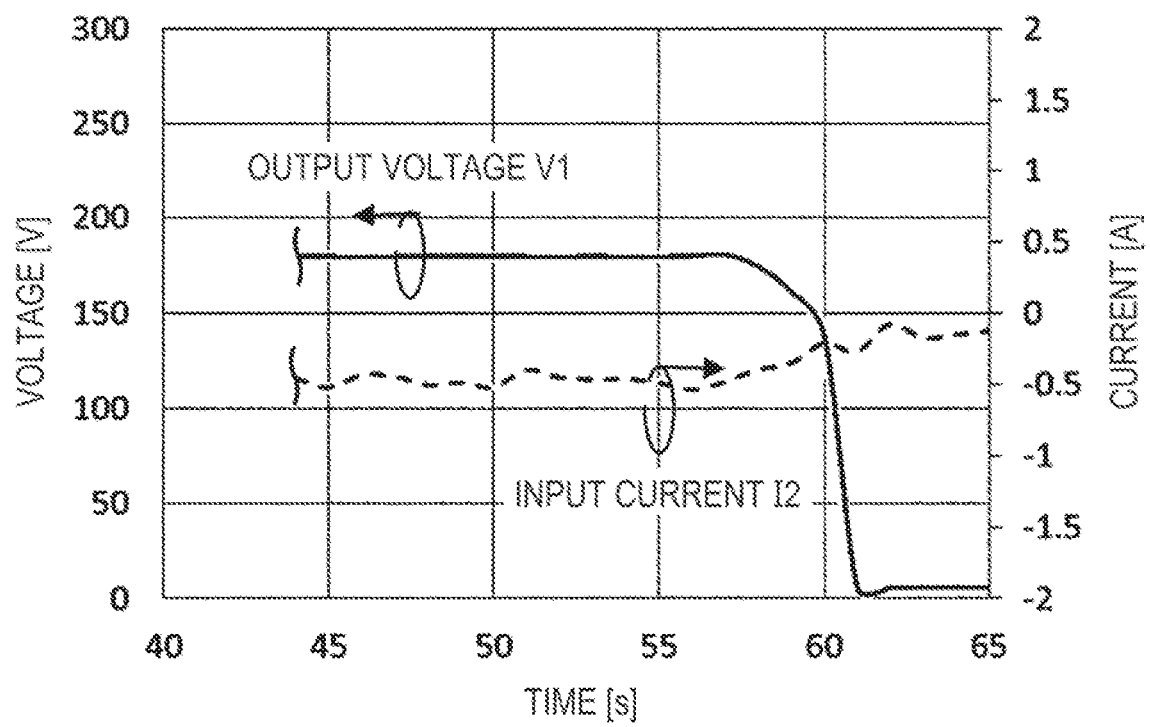
FIG. 9B is a diagram illustrating characteristics at a time of stopping according to the first embodiment.

FIG. 9B illustrates the output voltage V1 and the input current I2 at a time of stopping. It can be seen that, at the time of the stopping, too, the input current I2 was smoothly stopped.

In the DC-to-DC converter 100a according to the present embodiment, the certain second phase difference P2 may be 0°.

With this configuration, since the switching legs of the first full-bridge circuit and the switching legs of the second full-bridge circuit are switched in phase when the certain second phase difference P2 is 0°, the first step can be easily controlled.

In the DC-to-DC converter 100a according to the present embodiment, in the second step, a first phase difference P1 between the switching of the first full-bridge circuit and the switching of the second full-bridge circuit may be set such that input current becomes equal to or smaller than a certain value.

With this configuration, the second phase difference P2 between the switching legs of each full-bridge circuit can be increased to 180° while suppressing the input current to the certain value or smaller by changing the first phase difference P1 between the switching of the first full-bridge circuit and the switching of the second full-bridge circuit. By setting the target value of the input current to 0, for example, an effect of preventing inrush current becomes greater.

Here, a voltage of the first input/output terminals 1a and 1c and a voltage of the second input/output terminals 2a and 2c may be compared with each other, and a phase of a signal for driving the full-bridge circuit having a higher voltage may be caused to delay from a phase of a signal for driving the other full-bridge circuit.

Since current flows from the input/output terminals having a higher voltage to the other input/output terminals, an effect of suppressing input current can be produced in the second step by shifting the phase such that power is transmitted in an opposite direction.

In the DC-to-DC converter 100a according to the present embodiment, the control unit 4 may perform a third step, in which output voltage is adjusted to a target voltage by controlling input current by changing the first phase difference P1 between the switching of the first full-bridge circuit and the switching of the second full-bridge circuit.

With this configuration, the output voltage can be made closer to the target voltage with the phases of the switching legs of each full-bridge circuit shifted from each other by 180°. For example, the output voltage is detected, and a target value of the input current is determined on the basis of an error from the target voltage.

In addition, the input current is detected, and the input current is controlled on the basis of an error from the target input current by changing the first phase difference P1 between the switching of the first full-bridge circuit and the switching of the second full-bridge circuit.

By adjusting the output voltage to the target output voltage value by changing an input current value, the output voltage can be gradually adjusted to the target voltage with the input current. Input current can therefore be suppressed in the third step, too.

In the DC-to-DC converter 100a according to the present embodiment, the control unit 4 may include means for determining whether the output voltage has reached the target voltage in the third step within a certain period of time and means for increasing the first duty ratio if the output voltage has not reached the target voltage.

With this configuration, the output voltage can be adjusted to the target voltage regardless of the load. Depending on the input voltage and the load connected to an output, the output voltage might not reach the target voltage through driving based on the first duty ratio. In this case, the output voltage can be adjusted closer to the target voltage by increasing the first duty ratio by a certain value.

If the output voltage is adjusted to the target output voltage value by changing the input current value in this period, the output voltage can be gradually adjusted to the target voltage with the input current. In the third step, therefore, input current is suppressed regardless of the magnitude of the load since the first duty ratio is adjusted in accordance with the load connected.

In the DC-to-DC converter 100a according to the present embodiment, the control unit 4 may perform a fourth step, in which the duty ratios of the driving signals for the first, third, fifth, and seventh switching devices IGBT 11, IGBT 13, IGBT 21, and IGBT 23 are increased to a second duty ratio DU2. In the fourth step, the control unit 4 may adjust the output voltage to the target voltage by changing the first phase difference P1 between the switching of the first full-bridge circuit and the switching of the second full-bridge circuit.

With this configuration, input current can be suppressed even if the driving signals for the switching devices are gradually increased to the second duty ratio by adjusting the output voltage to the target voltage by changing the first phase difference P1 between the switching of the first full-bridge circuit and the switching of the second full-bridge circuit.

For example, the output voltage is detected, and the first phase difference P1 between the switching of the first full-bridge circuit and the switching of the second full-bridge circuit is changed on the basis of an error from the target voltage such that the error becomes 0. As a result, the output voltage follows the target voltage. Alternatively, the input current value may be changed such that the output voltage becomes the target output voltage value, that is, the output voltage may be caused to follow the target voltage by changing the input current.

The duty ratios of the driving signals for the switching devices are increased to the second duty ratio, and the phases of the switching legs of each full-bridge circuit are shifted from each other by 180°. Preparation for power transmission control based on the first phase difference P1 between the switching of the first full-bridge circuit and the switching of the second full-bridge circuit thus ends, and the activation is completed.

In the DC-to-DC converter 100a according to the present embodiment, at a time of stopping, the control unit 4 may perform a first stopping step, in which duty ratios of the driving signals for the first, third, fifth, and seventh switching devices IGBT 11, IGBT 13, IGBT 21, and IGBT 23 and/or duty ratios of the driving signals for the second, fourth, sixth, and eighth switching devices IGBT 12, IGBT 14, IGBT 22, and IGBT 24 are decreased to a certain duty ratio, and a second stopping step, in which a second phase difference P2 between switching of the first switching leg and switching of the second switching leg and a second phase difference P2 between switching of the third switching leg and switching of the fourth switching leg are changed to 0°.

With this configuration, output power can be slowly reduced by gradually reducing the duty ratios to a certain duty ratio at the time of stopping. Here, the output voltage/current and the input current may be adjusted to certain values.

In addition, voltages applied to the reactors can be gradually reduced and accordingly the output voltage can be slowly reduced by gradually changing the second phase difference P2 between the switching legs of each full-bridge circuit to 0°.

In the DC-to-DC converter 100a according to the present embodiment, a diode may be connected in parallel with each of the switching devices.

With this configuration, by connecting diodes in antiparallel with IGBTs, for example, a desired operation can be performed even when IGBTs (insulated-gate bipolar transistors) that do not include diodes are used as the switching devices.

In the DC-to-DC converter 100a according to the present embodiment, at least either the first reactor 16 or the second reactor 26 may be achieved by leakage inductance of the transformer.

With this configuration, since the first reactor 16 or the second reactor 26 is achieved by the leakage inductance, reduction in size and cost can be achieved.

Second Embodiment

A second embodiment of the present invention will be described hereinafter. Members having the same functions as those described in the above embodiment will be given the same reference numerals for convenience of description and description thereof will not be repeated.

Figure 10:
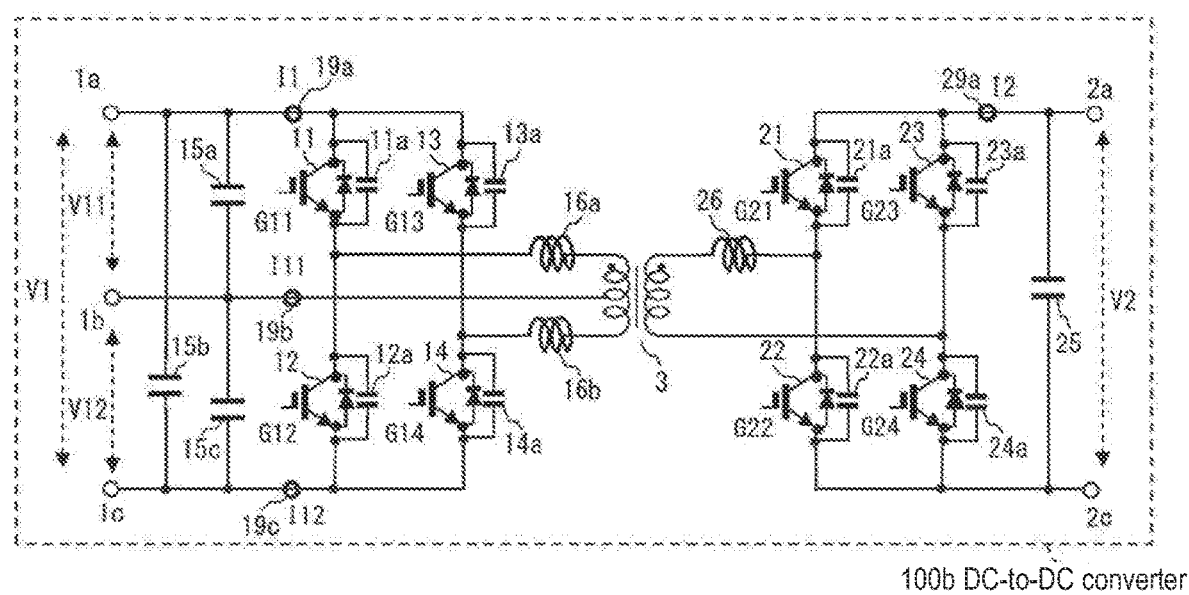
FIG. 10 is a diagram illustrating the configuration of a DC-to-DC converter according to a second embodiment of the present invention.
Figure 10:
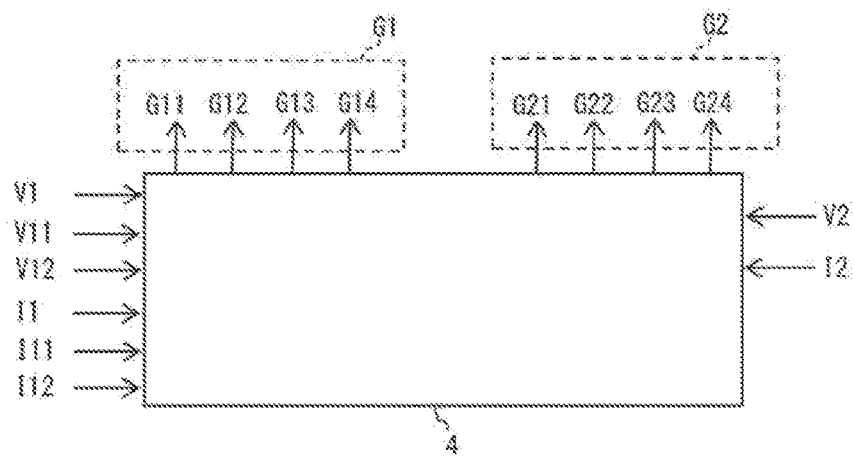

FIG. 10 is a configuration diagram illustrating a DC-to-DC converter 100b according to the second embodiment of the present invention. Differences from the configuration of the DC-to-DC converter 100a illustrated in FIG. 1 in the first embodiment will be described.

A center tap is provided for the primary winding of the transformer 3, and a third reactor 16b is connected to an end of the winding, for which the center tap is provided, to which a first reactor 16a is not connected. The center tap is connected to an input/output terminal 1b. A capacitor 15a is provided between the input/output terminals 1a and 1b, and a capacitor 15c is provided between the input/output terminals 1b and 1c.

In addition, the control unit 4 further includes at least means for detecting a voltage V12 between the input/output terminal 1b connected to the center tap and the input/output terminal 1c and a voltage V11 between the input/output terminals 1a and 1b.

Figure 11:
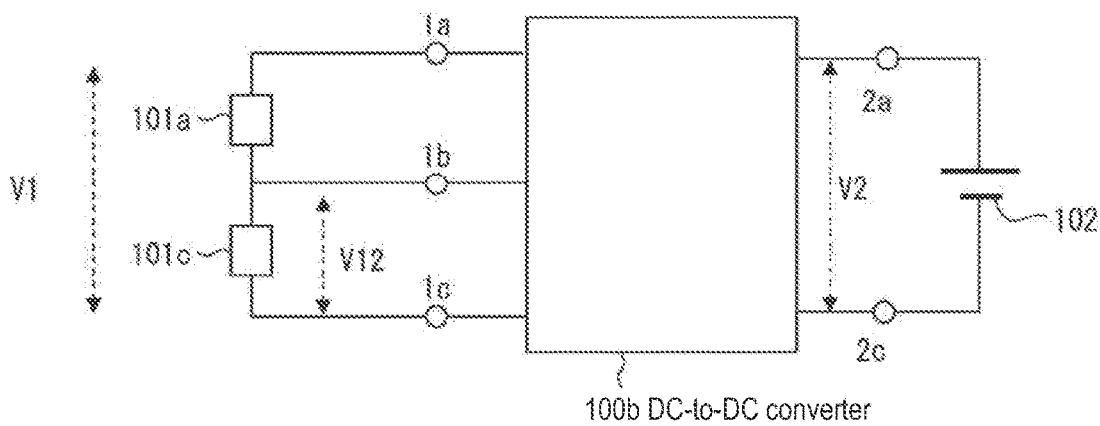
FIG. 11 is a configuration diagram illustrating the second embodiment.

In the present embodiment, as illustrated in FIG. 11, a load 101a is connected between the primary input/output terminals 1a and 1b of the DC-to-DC converter 100b illustrated in FIG. 10, and a load 101c is connected between the primary input/output terminals 1b and 1c. The storage battery 102 is connected between the secondary input/output terminals 2a and 2c. Here, the storage battery 102 transmits power to the loads 101a and 101c.

Figure 12:
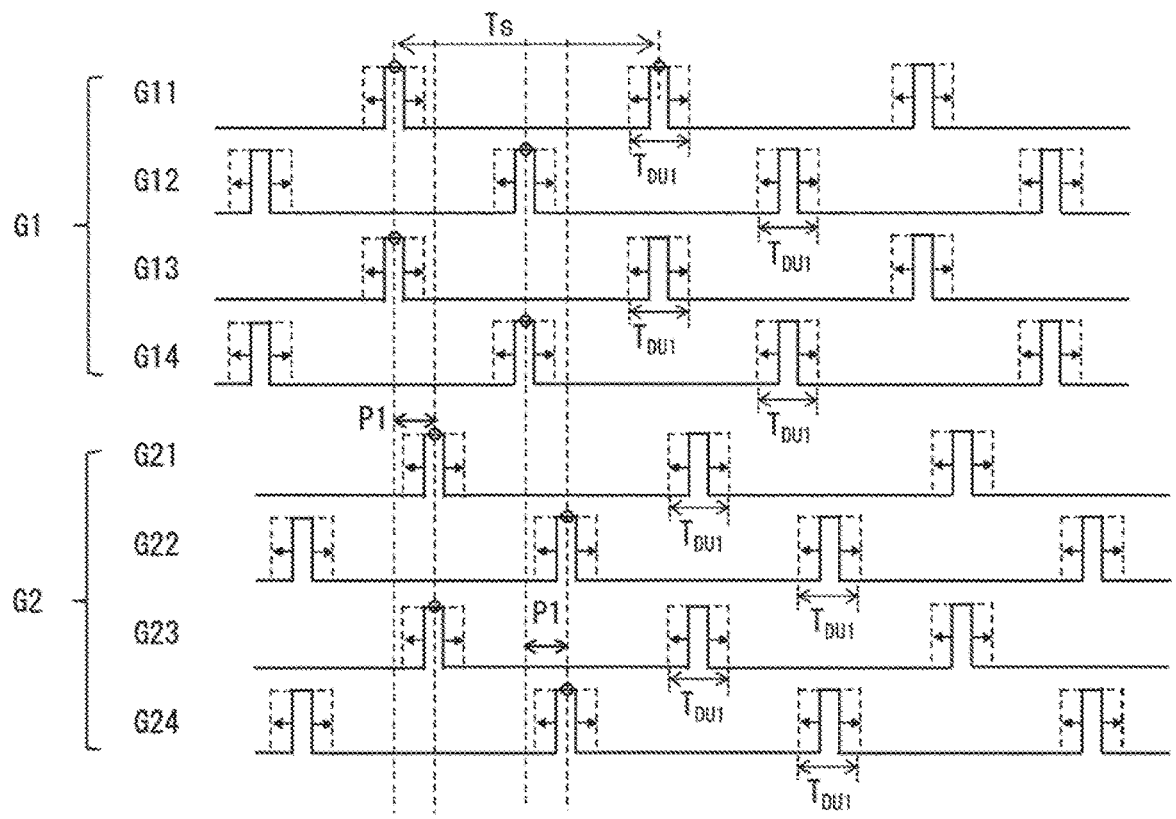
FIG. 12 is a diagram illustrating a first step in the second embodiment.

In order to start power conversion, first, as illustrated in FIG. 12, the control unit 4 performs the first step, in which the gate driving signals for the IGBTs that form the primary full-bridge circuit and the secondary full-bridge circuit are fixed to the period Ts and the duty ratios are increased to the first duty radio DU1. The period corresponding to the first duty ratio DU1 is denoted by $T_{DU1}$.

Although the IGBTs are driven by complementary PWM signals in the first embodiment, the duty ratios of the signals for driving the IGBTs are all set to the first duty ratio DU1 in the present embodiment.

That is, in the DC-to-DC converter 100b according to the present embodiment, the control unit 4 drives the first switching device IGBT 11, the second switching device IGBT 12, the third switching device IGBT 13, the fourth switching device IGBT 14, the fifth switching device IGBT 21, the sixth switching device IGBT 22, the seventh switching device IGBT 23, and the eighth switching device IGBT 24 using the signals having the first duty ratio.

Phases of the signals for driving the lower IGBTs 12, 14, 22, and 24 are shifted by 180° from phases of the signals for driving the upper IGBTs 11, 13, 21, and 23 for the driving. A short circuit in the switching legs can therefore be prevented by limiting the duty ratios to lower than 0.5.

That is, in the DC-to-DC converter 100b according to the present embodiment, the phases of the driving signals for the second switching device IGBT 12 and the fourth switching device IGBT 14 are shifted by 180° from the phases of the first switching device IGBT 11 and the third switching device IGBT 13 with the same duty ratio and/or the phases of the driving signals for the sixth switching device IGBT 22 and the eighth switching device IGBT 24 are shifted 180° from the phases of the driving signals for the fifth switching device IGBT 21 and the seventh switching device IGBT 23 with the same duty ratio. Here, the first duty ratio DU1 is 0.16 as in the first embodiment.

With this configuration, since the switching devices are driven with the same duty ratio, periods for which the switching devices remain turned on can be shortened, and inflow of unnecessary current is suppressed.

In the first step, the signals (G11 and G12) for driving the first switching leg included in the primary full-bridge circuit and the signals (G13 and G14) for driving the second switching leg are in phase with each other.

Figure 13A:
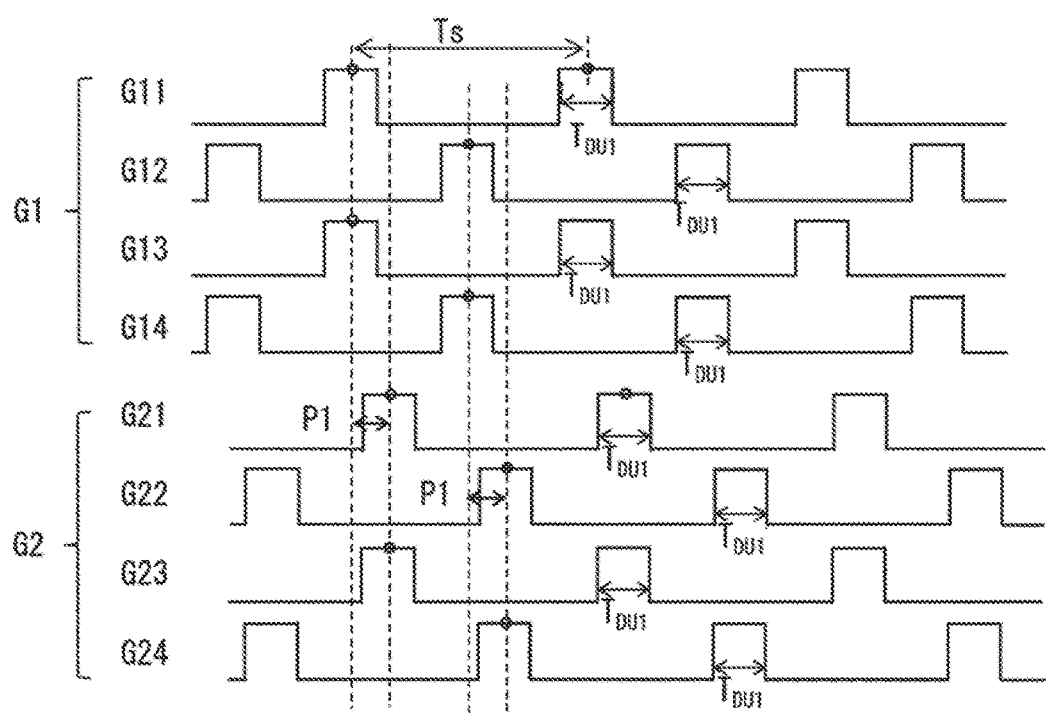
FIG. 13A is a diagram illustrating driving waveforms of switching devices at an end of the first step according to the second embodiment.

In addition, the signals (G21 and G22) for driving the third switching leg included in the secondary full-bridge circuit and the signals (G23 and G24) for driving the fourth switching leg are in phase with each other. FIG. 13A illustrates IGBT driving waveforms at an end of the first step.

Since all the duty ratios of the signals for driving the IGBTs are the first duty ratio, namely 0.16, the driving of the switching devices can be started without a conductive path formed due to simultaneous on states of diagonal IGBTs in each full-bridge circuit, insofar as the driving second phase difference P2 between the first switching leg and the second switching leg and the driving second phase difference P2 between the third switching leg and the fourth switching leg are equal to or smaller than (180°−(0.16×360°)).

That is, in the DC-to-DC converter 100b according to the present embodiment, the certain second phase difference P2 is equal to or smaller than:

(180°−(first duty ratio×360°))

The control unit 4 performs the first step, in which the duty ratios of the driving signals for the first switching device IGBT 11, the third switching device IGBT 13, the fifth switching device IGBT 21, and the seventh switching device IGBT 23 and/or the duty ratios of the driving signals for the second switching devices IGBT 12, the fourth switching device IGBT 14, the sixth switching device IGBT 22, and the eighth switching device IGBT 24 are increased to the first duty ratio, and the second step, in which the second phase difference P2 between the switching of the first switching leg and the switching of the second switching leg and the second phase difference P2 between the switching of the third switching leg and the switching of the fourth switching leg are changed to 180°.

With this configuration, the certain second phase difference P2 becomes equal to or smaller than:

(180°−(first duty ratio×360°))

The control unit 4 can increase, by performing the first step, in which the duty ratios of the driving signals for the first, third, fifth, and seventh switching devices and/or the duty ratios of the driving signals for the second, fourth, sixth, and eighth switching devices are increased to the first duty ratio, the duty ratios of the driving signals for the switching devices to the first duty ratio with current flowing to the first reactor 16a or the second reactor 26 limited.

Furthermore, the control unit 4 can change the second phase differences P2 between the switching legs to 180° while preventing inrush current by gradually changing the second phase difference P2 between the switching of the first switching leg and the switching of the second switching leg and the second phase difference P2 between the switching of the third switching leg and the switching of the fourth switching leg to 180°. Since the second step is performed with the first duty ratio, which is lower than the duty ratio during the normal operation, input current can be limited even if the phases between the switching legs are shifted from each other by up to 180°. As a result, an operation mode in which bidirectional power transmission control based on the control of the switching first phase differences P1 between the first and second full-bridge circuits can be easily performed with input current suppressed can be established.

Here, as in the first embodiment, the first phase difference P1 between the driving signals G1 (G11 to G14) for the primary full-bridge circuit and the driving signals G2 (G21 to G24) for the secondary full-bridge circuit is set to a fixed value so that the phases of the signals G2 for driving the secondary full-bridge circuit delay.

Figure 13B:
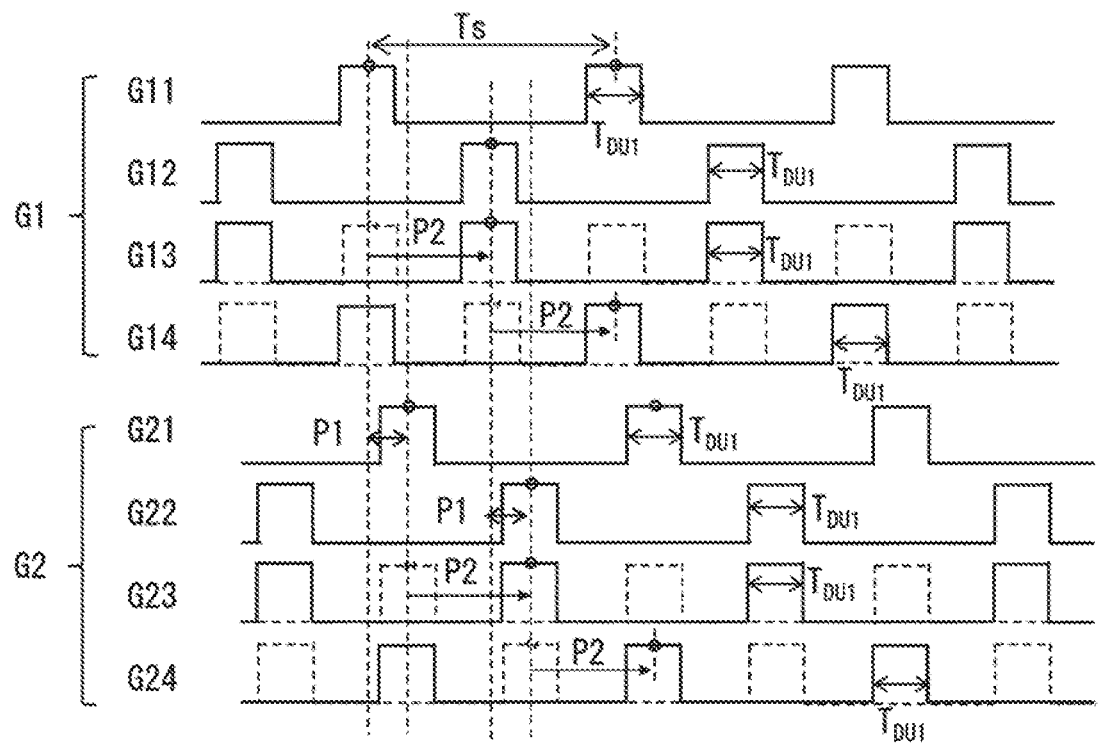
FIG. 13B is a diagram illustrating a second step according to the second embodiment.

Next, the second step illustrated in FIG. 13B is performed. As in the first embodiment, in the second step, the second phase difference P2 between the switching of the first switching leg and the switching of the second switching leg and the second phase difference P2 between the switching of the third switching leg and the switching of the fourth switching leg are changed to 180° at a certain speed.

Figure 14A:
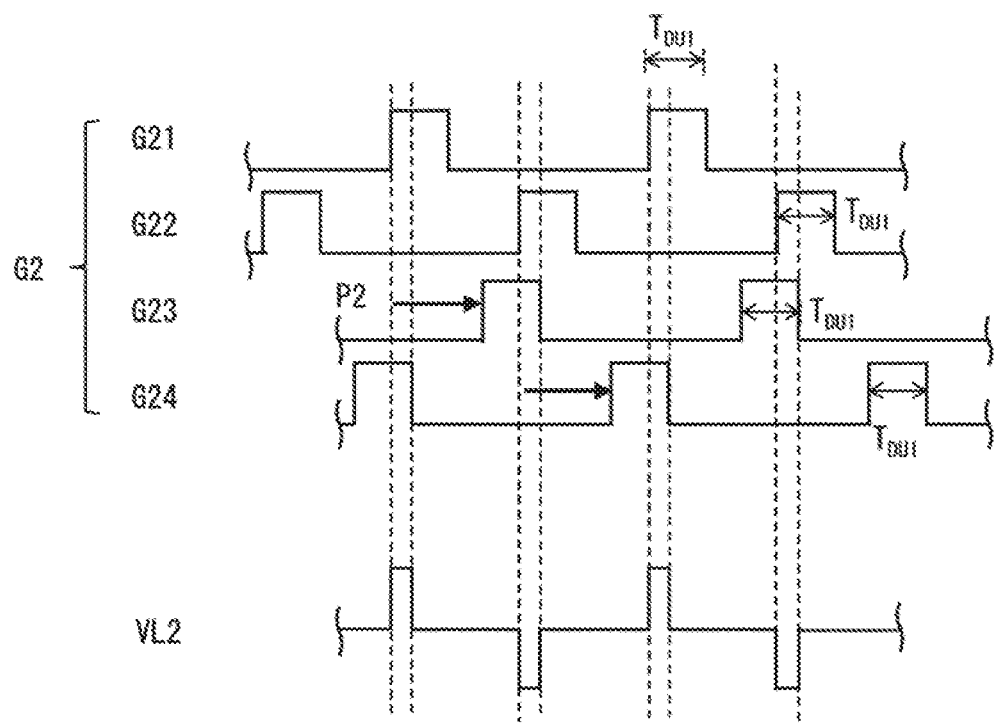
FIG. 14A is a diagram illustrating means for suppressing input current in a second step according to the second embodiment.

At this time, the pulse width of the voltage VL2 applied to the second reactor 26 on the secondary side connected to the voltage source (storage battery) can be gradually increased in accordance with the second phase difference P2. When periods for which the driving signals G21 and G24 and the driving signals G23 and G22 simultaneously remain turned on are short, for example, the pulse width of the voltage VL2 is small as illustrated in FIG. 14A. When the second phase difference P2 becomes 180°, however, the pulse width of the voltage VL2 increases to a width according to the first duty ratio DU1 as illustrated in FIG. 14B.

Since the pulse width of the voltage VL2 can be controlled on the basis of the second phase difference P2, inrush current in the second step can be suppressed by adjusting a speed at which the second phase difference P2 changes.

In addition, although, since the potential of the secondary voltage source is higher in the second step, too, the first phase difference P1 between the driving signals G1 (G11 to G14) for the primary full-bridge circuit and the driving signals G2 (G21 to G24) for the secondary full-bridge circuit is set to a fixed value such that the phases of the driving signals G2 delay, the first phase difference P1 may be dynamically changed, instead. Input current can thus be suppressed in the second step by setting a certain value such that the phases of the driving signals G2 delay.

In the DC-to-DC converter 100b according to the present embodiment, too, the first phase difference P1 between the switching of the first full-bridge circuit and the switching of the second full-bridge circuit may be set in the second step such that input current becomes equal to or smaller than a certain value.

With this configuration, the second phase difference P2 between the switching legs of each full-bridge circuit can be increased to 180° while suppressing the input current to the certain value or smaller by changing the first phase difference P1 between the switching of the first full-bridge circuit and the switching of the second full-bridge circuit. For example, an effect of preventing inrush current becomes greater by setting the target value of the input current to 0.

The DC-to-DC converter 100b according to the present embodiment may further include a capacitor circuit, which is a first capacitor and a second capacitor connected in series with each other. The capacitor circuit may be connected in parallel with the first full-bridge circuit or the second full-bridge circuit. A center tap may be provided for a primary winding or a secondary winding of the transformer. The center tap may be connected to the node between the first and second capacitors. A third reactor 16b may be connected to an end of the primary or secondary winding, whichever the center tap is provided, to which the first or second reactor 16 or 26 is not connected.

With this configuration, since the voltage of the input/output terminals is divided by the first and second capacitors and the center tap provided for the transformer is connected, an intermediate voltage can be output. The configuration of the primary circuit can be made symmetric by selecting substantially the same value for the first and second capacitors and the first and second reactors 16 and 26. Furthermore, when a load connected to the first capacitor and a load connected to the second capacitor are the same, or when loads are connected to both ends of the capacitor circuit, the primary circuit including the loads becomes symmetric. By adjusting the switching phases of the first and second full-bridge circuits, therefore, transmission power can be controlled with the voltages of the first and second capacitors balanced.

Furthermore, by making the duty ratios of the driving signals for the switching devices the same, the intermediate voltage can be maintained at the times of activation and stopping. As a result, requirements relating to breakdown voltages of the first and second capacitors can be made less strict, which reduces cost.

Next, as in the first embodiment, the third step, in which output voltage is adjusted to a target voltage by controlling input current by changing the first phase difference P1 between the switching of the first full-bridge circuit and the switching of the second full-bridge circuit, is performed.

Figure 15:
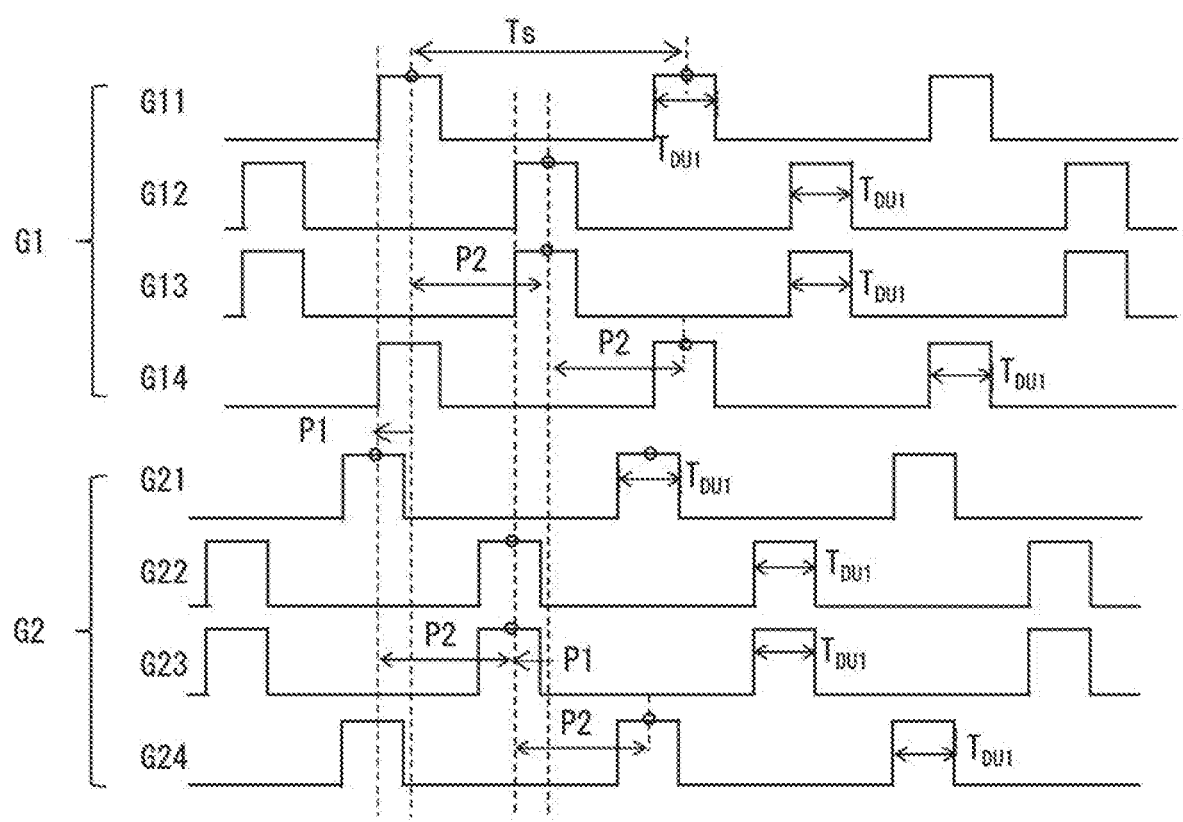
FIG. 15 is a diagram illustrating driving waveforms of the switching devices in a third step according to the second embodiment.

In the third step according to the present embodiment, the duty ratios of the driving signals G1 (G11 to G14) for the primary full-bridge circuit and the driving signals G2 (G21 to G24) for the secondary full-bridge circuit are the same in waveforms as illustrated in FIG. 15.

Figure 16:
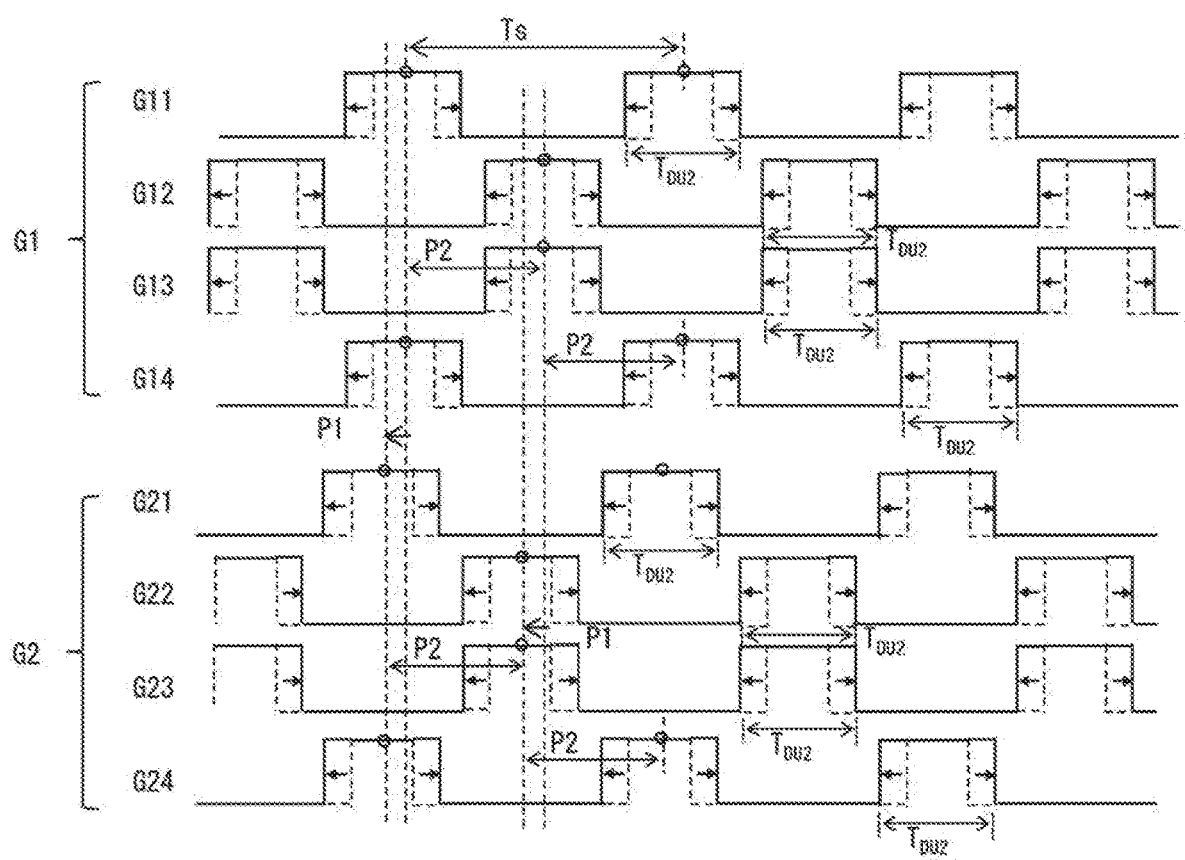
FIG. 16 is a diagram illustrating a fourth step according to the second embodiment.

Next, as illustrated in FIG. 16, the fourth step, in which the duty ratios of the driving signals for all the switching device are increased to the second duty ratio DU2, is performed. The period corresponding to the second duty ratio DU2 is denoted by $T_{DU2}$. Here, the second duty ratio DU2 is 0.45.

For example, as in the first embodiment, the primary output voltage V1 is adjusted to the primary target output voltage using control blocks obtained by replacing the main circuit 100a of the control blocks illustrated in FIG. 8B with the main circuit 100b.

The control unit 4 detects the primary output voltage V1 and determines the first phase difference P1 on the basis of an error from the V1 target value using the voltage controller 40b. As illustrated in FIG. 16, the signal generator 49 drives the IGBTs in the main circuit 100b by generating driving signals having the first phase difference P1.

Although the control blocks illustrated in FIG. 8B are used here, the control blocks illustrated in FIG. 6B may be used, instead.

Outputting of the primary target output voltage is achieved, preparation for transmission of certain power ends, and activation is completed by performing the fourth step with phases of the switching legs of each full-bridge shifted from each other by 180°.

In addition, at a time of stopping, the first stopping step, in which the duty ratios of the driving signals for all the switching devices are decreased to the first duty ratio, and the second stopping step, in which the second phase difference P2 between the switching of the first switching leg and the switching of the second switching leg and the second phase difference P2 between the switching of the third switching leg and the switching of the fourth switching leg are changed to 0°, are performed in the present embodiment.

Figure 17A:
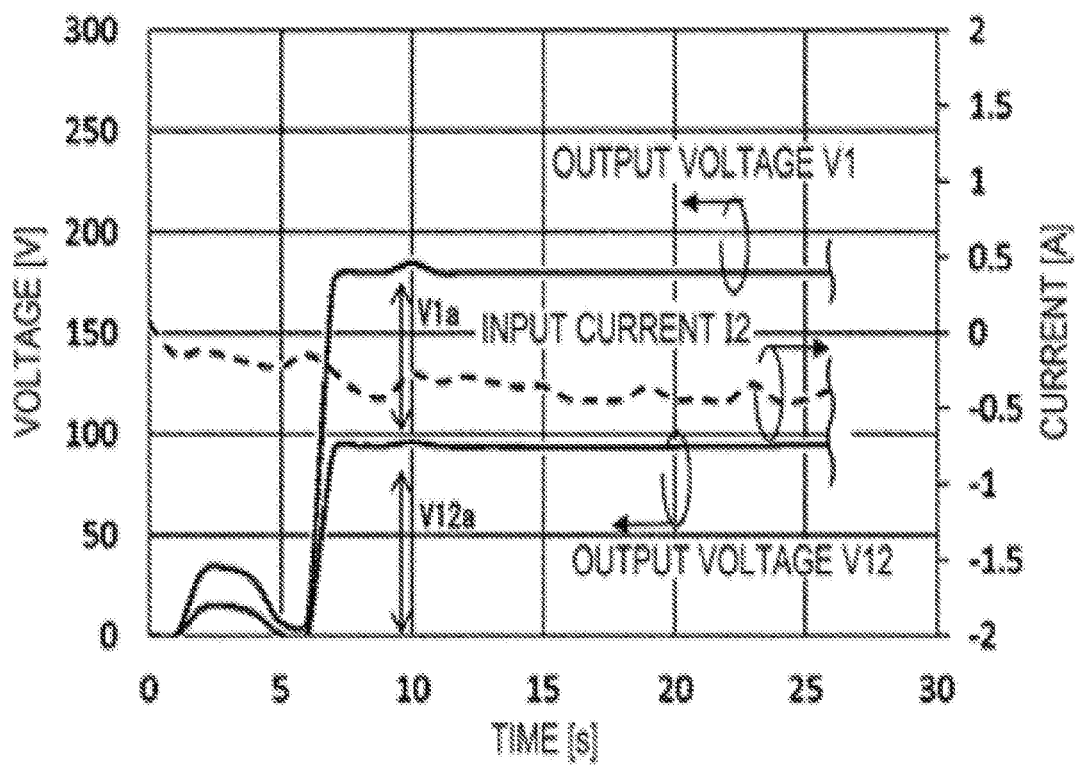
FIG. 17A is a diagram illustrating characteristics at a time of activation according to the second embodiment.

FIG. 17A illustrates changes in the output voltage V1, the input current I2, and an intermediate voltage V12 at a time of starting. Here, the secondary input voltage V2 was 180 V, the primary load 101a was 0.5 kΩ, the primary load 101c was 0.5 kΩ, and the primary target output voltage was 180 V. It can be seen that the input current I2 was smoothly activated without inrush current.

Figure 17B:
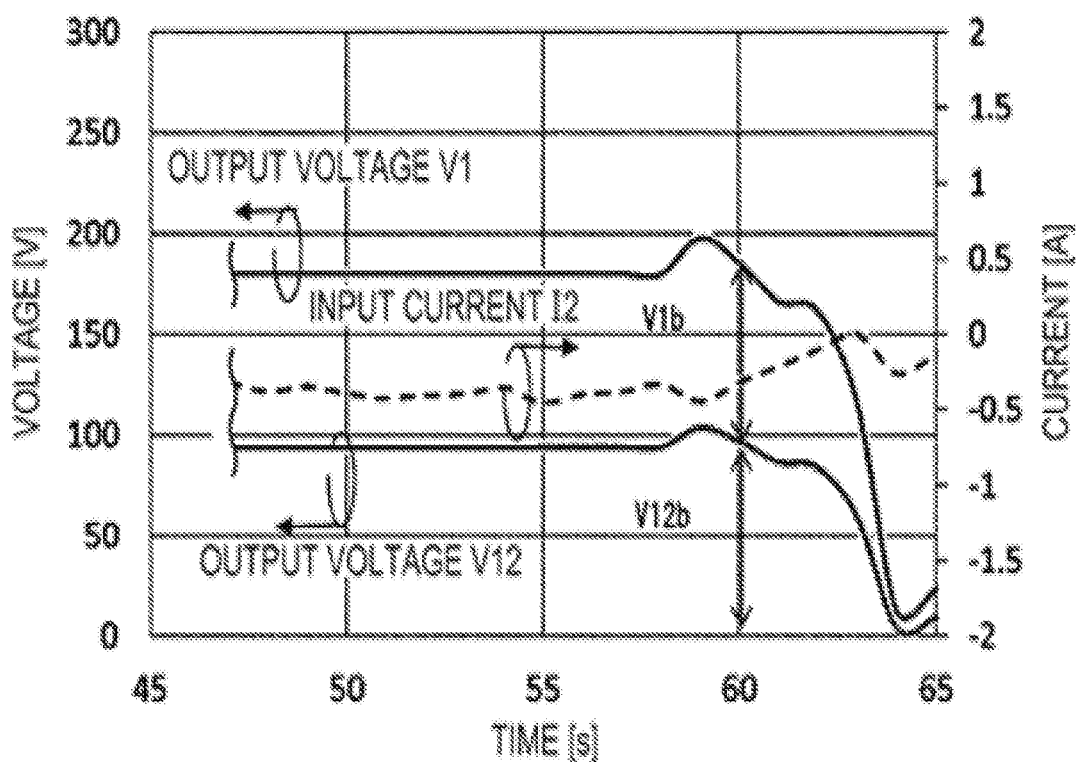
FIG. 17B is a diagram illustrating characteristics at a time of stopping according to the second embodiment.

FIG. 17B illustrates the output voltage V1, the input current I2, and the intermediate voltage V12 at a time of stopping. It can be seen that at the time of the stopping, too, the input current I2 was smoothly stopped.

Here, the DC-to-DC converter 100b (FIG. 11) according to the present embodiment can prevent inrush current of the secondary input current I2 and achieve smooth activation and stopping by performing a starting process and a stopping process through the same driving signals and control steps as in the first embodiment.

Figure 18A:
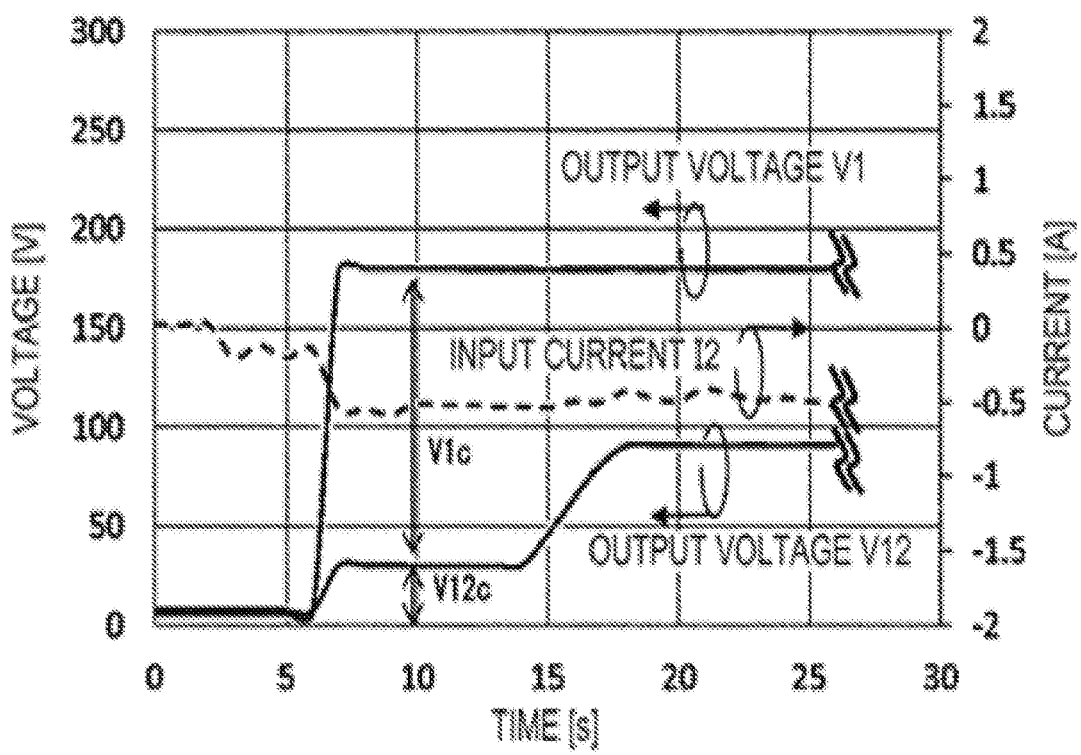
FIG. 18A is a diagram illustrating characteristics at a time of activation according to the second embodiment.
Figure 18B:
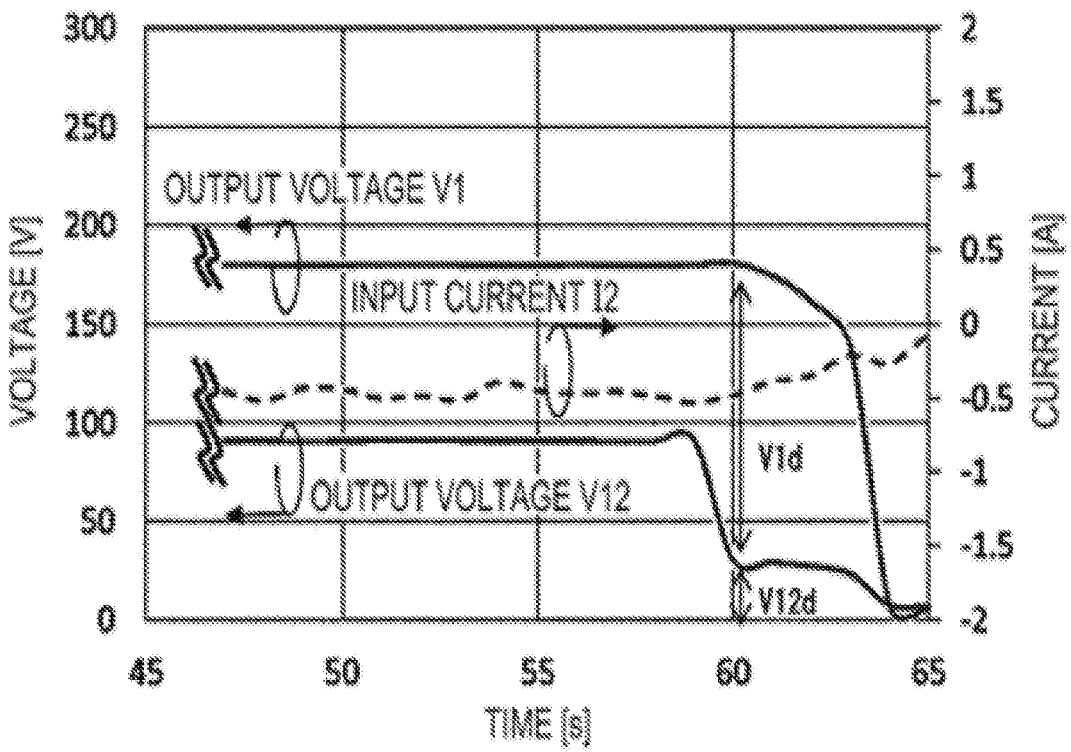
FIG. 18B is a diagram illustrating characteristics at a time of stopping according to the second embodiment.
Figure 19A:
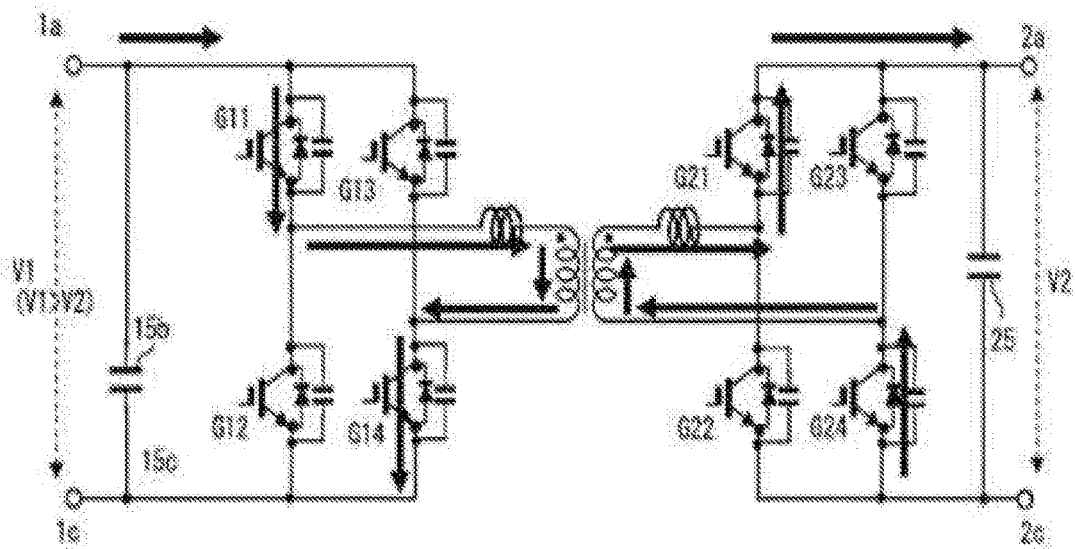
FIG. 19A is a diagram illustrating a problem of a conventional DC-to-DC converter.
Figure 19B:
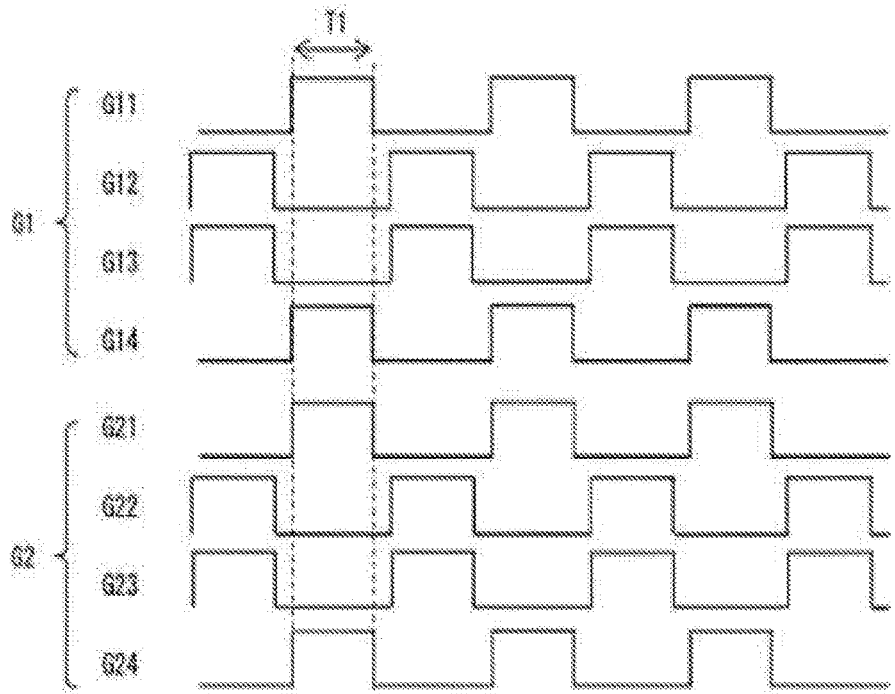
FIG. 19B is another diagram illustrating the problem of the conventional DC-to-DC converter.

FIG. 18A illustrates changes in the output voltage V1, the input current I2, and the intermediate voltage V12 at a time of starting in this case. FIG. 18B illustrates the output voltage V1, the input current I2, and the intermediate voltage V12 at a time of stopping. It can be seen that the input current I2 was smoothly controlled at the times of the starting and the stopping.

It can also be seen by comparing characteristics at the times of the starting and the stopping illustrated in FIGS. 17A and 17B, and characteristics at the times of the starting and the stopping illustrated in FIGS. 18A and 18B with each other that the intermediate voltage V12 could be maintained at half the output voltage V1 at the times of the starting and the stopping in the case of the method described in the second embodiment compared to the case of the method based on the same driving signals and control steps as in the first embodiment.

That is, at the time of the starting, a voltage difference V1c and a voltage difference V12c are significantly different from each other in FIG. 18A, but in FIG. 17A, a voltage difference V1a and a voltage difference V12a remain substantially the same.

In addition, at the time of the stopping, a voltage difference V1d and a voltage difference V12d are significantly different from each other in FIG. 18B, but in FIG. 17B, a voltage difference V1b and a voltage difference V12b remain substantially the same. With this method according to the second embodiment, therefore, since the all duty ratios of the signals for driving the IGBTs of the primary full-bridge circuit were the same, it can be seen that an effect of maintaining the potential of the input/output terminal 1b at a voltage half the primary output voltage could be produced at the times of both the starting and the stopping.

Voltages applied to the capacitors 15a and 15c can therefore be kept low at times of activation and stopping, which improves reliability. In addition, because capacitors whose breakdown voltages are low can be used, cost can be reduced.

The control method according to the second embodiment may be used for the circuit configuration according to the first embodiment.

Embodiments Based on Software

The control blocks (especially the control unit 4) of the DC-to-DC converter 100a or 100b may be achieved by a logic circuit (hardware) formed in an integrated circuit (IC chip) or may be achieved by software.

In the latter case, the DC-to-DC converter 100a or 100b includes a computer that executes commands included in a program, which is software for achieving the functions. The computer includes, for example, at least one processor (control device) and at least one computer-readable storage medium storing the program. The processor of the computer reads the program from the storage medium and executes the program to achieve an object of the present invention. A CPU (central processing unit), for example, may be used as the processor. A "non-transitory physical medium", that is, for example, a ROM (read-only memory), a tape, a disk, a card, a semiconductor memory, or a programmable logic circuit, may be used as the storage medium. A RAM (random-access memory) or the like into which the program is loaded may also be included. The program may be supplied to the computer through any type of transmission medium capable of transmitting the program (a communication network, broadcast waves, etc.), instead. An aspect of the present invention can be achieved by a mode of data signals embedded in carrier waves in which the program is embodied through electronic transmission.

The present invention is not limited to the above-described embodiments and may be modified in various ways within the scope defined by the claims. The technical scope of the present invention also includes embodiments obtained by appropriately combining together technical means disclosed in different embodiments. Furthermore, new technical features can be created by combining together technical means disclosed in different embodiments.

REFERENCE SIGNS LIST 1a, 1c primary input/output terminal
2a, 2c secondary input/output terminal
3 transformer
4 control unit
11, 12, 13, 14, 21, 22, 23, 24 IGBT
11a, 12a, 13a, 14a, 21a, 22a, 23a, 24a capacitor
15, 25 capacitor
16, 26 reactor

The invention claimed is:

1. A Direct Current (DC)-to-DC converter comprising:
a first switching leg including a first switching device and a second switching device connected to each other;
a second switching leg including a third switching device and a fourth switching device connected to each other;
a first full-bridge circuit in which the first switching leg and the second switching leg are connected in parallel with each other and that converts direct current voltage from a first input/output terminal into alternating current voltage;
a transformer;
a first reactor, having one end connected to a node between the first switching device and the second switching device and another end connected to an end of a primary winding of the transformer;
a third switching leg including a fifth switching device and a sixth switching device connected to each other;
a fourth switching leg including a seventh switching device and an eighth switching device connected to each other;
a second full-bridge circuit in which the third switching leg and the fourth switching leg are connected in parallel with each other and that converts direct current voltage from a second input/output terminal into alternating current voltage;
a second reactor, having one end connected to a node between the fifth switching device and the sixth switching device and another end connected to a secondary winding of the transformer,
wherein each of the switching devices has a respective capacitor connected in parallel; and
a control unit that:
controls power transmission by generating signals for driving the switching devices and adjusting a first phase difference between switching of the first full-bridge circuit and switching of the second full-bridge circuit, and
when activated at start-up, switches one or more of a combination of the first switching leg and the second switching leg and a combination of the third switching leg and the fourth switching leg with a certain second phase difference and drives the first, third, fifth, and seventh switching devices or the second, fourth, sixth, and eighth switching devices with a first duty ratio, is the first duty ratio lower than a duty ratio during normal operation.

2. The DC-to-DC converter according to claim 1, wherein the control unit, when activated at start-up, switches the first switching leg and the second switching leg with the certain second phase difference.

3. The DC-to-DC converter according to claim 1, wherein the control unit, when activated at start-up, switches the third switching leg and the fourth switching leg with the certain second phase difference.

4. The DC-to-DC converter according to claim 1, wherein the control unit, when activated at start-up, switches the combination of the first switching leg and the second switching leg and the combination of the third switching leg and the fourth switching leg with the certain second phase difference.

5. The DC-to-DC converter according to claim 1, wherein the control unit drives the second, fourth, sixth, and eighth switching devices using complementary signals of the signals for driving the first, third, fifth, and seventh switching devices or drives the first, third, fifth, and seventh switching devices using complementary signals of the signals for driving the second, fourth, sixth, and eighth switching devices.

6. The DC-to-DC converter according to claim 1, wherein the control unit performs:
a first step, in which one or more of duty ratios of the driving signals for the first, third, fifth, and seventh switching devices and duty ratios of the driving signals for the second, fourth, sixth, and eighth switching devices are increased to the first duty ratio; and
a second step, in which a third phase difference between switching of the first switching leg and switching of the second switching leg and a fourth phase difference between switching of the third switching leg and switching of the fourth switching leg are changed to 180°.

7. The DC-to-DC converter according to claim 6, wherein, in the second step, the first phase difference between the switching of the first full-bridge circuit and the switching of the second full-bridge circuit is set such that input current becomes equal to or smaller than a certain value.

8. The DC-to-DC converter according to claim 6, wherein the control unit performs a third step, in which output voltage is adjusted to a target voltage by controlling input current by changing the first phase difference between the switching of the first full-bridge circuit and the switching of the second full-bridge circuit.

9. The DC-to-DC converter according to claim 1, wherein the control unit drives the first, second, third, fourth, fifth, sixth, seventh, and eighth switching devices using signals having the first duty ratio.

10. The DC-to-DC converter according to claim 9, wherein one or more of the driving signals for the second and fourth switching devices have same duty ratios as the driving signals for the first and third switching devices, respectively, but are out of phase with each other by 180° and the driving signals for the sixth and eighth switching devices have same duty ratios as the driving signals for the fifth and seventh switching devices, respectively, but are out of phase with each other by 180°.

11. The DC-to-DC converter according to claim 9, wherein:
the certain second phase difference is equal to or smaller than (180°−(first duty ratio×360°)); and
the control unit performs a first step, in which one or more of duty ratios of the driving signals for the first, third, fifth, and seventh switching devices and duty ratios of the driving signals for the second, fourth, sixth, and eighth switching devices are increased to the first duty ratio, and a second step, in which the second phase difference is changed to 180°.

12. The DC-to-DC converter according to claim 11, wherein, in the second step, the control unit sets first phase difference between the switching of the first full-bridge circuit and the switching of the second full-bridge circuit such that input current becomes equal to or smaller than a certain value.

13. The DC-to-DC converter according to claim 11, wherein the control unit performs a third step, in which output voltage is adjusted to a target voltage by controlling input current by changing the first phase difference between the switching of the first full-bridge circuit and the switching of the second full-bridge circuit.

14. The DC-to-DC converter according to claim 13, wherein the control unit performs the third step by:
determining whether the output voltage has reached the target voltage within a certain period of time; and
increasing the first duty ratio if the output voltage has not reached the target voltage.

15. The DC-to-DC converter according to claim 13, wherein the control unit performs a fourth step, in which:
the duty ratios of the driving signals for the first, third, fifth, and seventh switching devices are increased to a second duty ratio; and
the output voltage to the target voltage by changing the first phase difference between the switching of the first full-bridge circuit and the switching of the second full-bridge circuit.

16. The DC-to-DC converter according to claim 1, wherein the certain second phase difference is 0°.

17. The DC-to-DC converter according to claim 1, wherein, at a time of stopping, the control unit performs:
a first stopping step, in which one or more of duty ratios of the driving signals for the first, third, fifth, and seventh switching devices and duty ratios of the driving signals for the second, fourth, sixth, and eighth switching devices are decreased to a certain duty ratio; and
a second stopping step, in which a third phase difference between switching of the first switching leg and switching of the second switching leg and a fourth phase difference between switching of the third switching leg and switching of the fourth switching leg are changed to 0°.

18. The DC-to-DC converter according to claim 1, further comprising:
a capacitor circuit including a first capacitor and a second capacitor connected in series with each other, wherein:
wherein the capacitor circuit is connected in parallel with the first full-bridge circuit, wherein a center tap is provided for the primary winding of the transformer, wherein the center tap is connected to a node between the first and second capacitors, and wherein a third reactor is connected to an end of the primary winding in which the first reactor is not connected to; or
wherein the capacitor circuit is connected in parallel with the second full-bridge circuit, wherein the center tap is provided for the secondary winding of the transformer, wherein the center tap is connected to the node between the first and second capacitors, and wherein the third reactor is connected to an end of the secondary winding in which the second reactor is not connected to.

19. The DC-to-DC converter according to claim 1, wherein each of the switching devices has a respective diode connected in parallel.

20. The DC-to-DC converter according to claim 1, wherein at least the first reactor or the second reactor comprises leakage inductance of the transformer.

* * * * *